US006570557B1

(12) United States Patent
Westerman et al.

(10) Patent No.: US 6,570,557 B1
(45) Date of Patent: May 27, 2003

(54) MULTI-TOUCH SYSTEM AND METHOD FOR EMULATING MODIFIER KEYS VIA FINGERTIP CHORDS

(75) Inventors: Wayne Carl Westerman, Newark, DE (US); John Greer Elias, Townsend, DE (US)

(73) Assignee: Finger Works, Inc., Townsend, DE (US)

( * ) Notice: Subject to any disclaimer, the term of this patent is extended or adjusted under 35 U.S.C. 154(b) by 78 days.

(21) Appl. No.: 09/681,178

(22) Filed: Feb. 10, 2001

(51) Int. Cl.[7] ............................. G09G 5/00; H03K 17/96
(52) U.S. Cl. ..................... 345/173; 345/168; 345/773; 341/22; 400/489
(58) Field of Search ............................. 345/173, 773, 345/168; 341/22; 400/489

(56) References Cited

U.S. PATENT DOCUMENTS

| 5,017,030 A | * | 5/1991 | Crews ........................ 400/485 |
| 5,194,862 A | * | 3/1993 | Edwards ..................... 341/20 |
| 5,281,966 A | * | 1/1994 | Walsh ......................... 341/22 |
| 5,642,108 A | * | 6/1997 | Gopher et al. ............... 341/22 |
| 5,689,253 A | * | 11/1997 | Hargreaves et al. ........ 341/22 |
| 5,808,567 A | * | 9/1998 | McCloud ..................... 341/20 |
| 5,825,352 A | * | 10/1998 | Bisset et al. ............... 345/173 |
| 6,107,997 A | * | 8/2000 | Ure .............................. 345/173 |
| 6,323,846 B1 | * | 11/2001 | Westerman et al. ........ 345/173 |

* cited by examiner

Primary Examiner—Steven Saras
Assistant Examiner—William Spencer

(57) ABSTRACT

A multi-touch system is disclosed that recognizes simultaneous touchdown of four fingers on, above, or below the home row of keys as a modifier chord and applies modifiers such as Shift, Ctrl, or Alt to subsequent touch activity until none of the chord fingertips remain touching. Touches by the thumb of the modifier chord hand that occur before any modifiable typing or clicking activity cause the modifier chord to be canceled and reinterpreted as hand resting. The Shift modifier may be released temporarily during thumb keypresses that are intermixed with typing of capitalized characters. Distributing the modifier chord touches across different zones or key rows selects multiple modifiers. In an alternative embodiment, different modifiers can be selected with different arrangements of the fingers relative to one another within the chord, irrespective of absolute hand alignment with the touch surface.

11 Claims, 18 Drawing Sheets

MULTI-TOUCH SYSTEM AND METHOD FOR EMULATING MODIFIER KEYS VIA FINGERTIP CHORDS

BACKGROUND OF THE INVENTION

1. Field of the Invention

The present invention pertains to multi-touch input systems and methods, and more particularly to a mixture of chord keying, gesture recognition and touch typing techniques.

2. The Related Art

The primary use of chords, or simultaneous finger presses, within the data entry art has been in chord keying schemes that map each letter of the alphabet or even shorthand word parts to a different finger combination. This allows chord keyboards to have a reduced number of keys, often limited to a home row of keys. This in turn reduces finger travel and potentially speeds typing. Some schemes, like U.S. Pat. No. 5,281,966 to Walsh, adopt a mapping that is sensibly organized so as to be easy to learn and remember, while others, such as U.S. Pat. No. 5,642,108 to Gopher et al., emphasize long-term keying performance by assigning the most frequently entered letters of the alphabet to those finger combinations that are quickest and easiest to perform. In U.S. Pat. No. 5,808,567, McCloud discloses a scheme for communicating with three-finger chords. In this system, a touch of the index finger on one of nine regions of a small selector pad can be modified by thumb and/or middle finger presses on switch pads adjacent to the selector pad.

The recent development of multiple-touch sensitive surfaces that lack the restrictions of distinct mechanical keys warrants a reexamination of chording schemes. Direct adaptation of the chord keying schemes cited above to a multi-touch surface certainly seems feasible, but may not be desirable. U.S. Pat. No. 5,825,352 to Bisset et al. describes a touchpad with row and column electrodes that produces pointing in response to single finger motion and dragging in response to two finger motion. U.S. Pat. No. 6,107,997, Ure utilizes the touch sensor array of U.S. Pat. No. 5,194,862 and interprets single finger motions as pointing while interpreting various placements of a 2-finger chord on a grid as key entry. In U.S. application Ser. No. 09/236,513, however, Westerman and Elias take yet another approach, interpreting asynchronous touches on a multi-touch surface (MTS) as conventional single-finger typing while interpreting motions initiated by chords as pointing, clicking, and other gesture commands. We prefer this approach for the following reasons: learning a few new chords for graphical manipulation is much easier than learning a slew of new chords for typing the whole alphabet, and graphical manipulation seems a better use of chords in today's graphics intensive computing environment. In dictation situations where greater text entry speeds are needed than can be achieved with non-chordic keying, adopting a continuous speech recognition system for text entry is becoming more practical than learning a chord keying technique.

Non-chordic touch typing on surfaces that provide limited tactile feedback presents its own difficulties. If the typist is not careful, the hands or individual fingers tend to drift out of alignment with the key layout, or more particularly with the home row of keys where hands normally rest. Reaching for punctuation and modifier keys located on the periphery of QWERTY computer keyboard layouts exacerbates this drift. Though the Shift modifier key is not particularly far from the home row keys, the direction of pinky motion needed to reach Shift strongly pulls the other fingertips off their alignment with home row. Since the Shift modifier key must be reached so frequently to capitalize words, even typists using mechanical keyboards have long complained about the awkward pinky twist and ulnar deviation at the wrist necessary to hold it down. Accurately hitting the Shift keys becomes, if anything, more awkward on a relatively smooth surface that does not give like a mechanical key.

In the related ergonomic and chord keyboard art exemplified by FIG. 2 modifier keys such as Shift, Ctrl, and Alt are often allocated to the thumbs (e.g. U.S. Pat. No. 5,642,108 to Gopher et al. and U.S. Pat. No. 5,689,253 to Hargreaves et al.) or to palm presses, as in U.S. Pat. No. 5,017,030 to Crews. However, for a multi-touch surface, reaching the thumb for modifier keys poses the same drift exacerbation problems as reaching by the pinky, and palm touches should be ignored to encourage hand resting. Thus there exists a need in the multi-touch and chord keying art for alternative methods to activate modifier keys without drawing any fingers away from home row.

BRIEF SUMMARY OF THE INVENTION

In its primary aspect, this invention introduces four-fingertip modifier chords to eliminate the hand twist and reach traditionally required to activate modifier keys. Simultaneously dropping the four long fingertips of a hand into a modifier zone on or near the home row keys applies the Shift modifier to subsequent typing or pointing input so long as any finger from the modifier chord remains touching the surface. Typically, then, the modifier will apply to activity by the opposite hand, but the present invention also lets a hand modify its own typing, thereby allowing capitalization of whole words, if at least one of its modifier chord fingertips remains touching as others lift to strike nearby keys. The four-fingertip (excluding the thumb) chord is preferred for this role because it is the easiest to drop and hold on the surface besides the five-finger chord, which must be reserved for hand resting.

Since the four-fingertip chord is also preferred for window scrolling, and since it is often a prelude to dropping the thumb into the full five-finger hand resting chord, the present invention takes special precautions to prevent accidental modifier activation. The modifier press signal is not sent to the host computer immediately upon detection of the modifier chord touchdown. The modifier press will only be sent, commiting the modifier, upon detection of modifiable input activity by other than the thumb of the modifying hand. Modifiable input activity can include any user action that produces a keypress, pointing, dragging, clicking or other command for the host computer, but does not typically include resting touches that cause no signals to be output. Any touch by the modifying hand's thumb detected before commit will immediately cancel the modifier chord, effectively turning it into a hand resting chord. Such thumb touches after the modifier press or commit need not permanently cancel the modifier. However, if these thumb touches represent editing keys such as Space or BackSpace keypresses, the Shift modifier signal may release temporarily while the thumb key is transmitted since the typist is most likely just erasing or putting a normal space between two capitalized words.

Restricting the Shift modifier chord to a zone along home row encourages typists to return their hands to the home typing position. Furthermore, this allows a Ctrl modifier zone to be established along the row of keys above home row, an easy stretch from home row. A third modifier zone can be established along the row of keys below home row for rarer modifiers such as Alt, Windows, Open Apple, or Meta. Even a fourth modifier zone is possible approximately two key rows below home row. Note that all of these modifier zones can be reached through straight flexion or extension of the fingers from their home row position-absolutely no twisting or rotation of the wrist or fingers is necessary.

According to the present invention, multiple modifiers are activated by the same hand simultaneously when the fingertips of the modifier chord are clearly distributed into different modifier zones. To compensate for the natural arch in a row of fingertips, the vertical offset of each finger is measured relative to the home row key the finger normally rests upon. Accidental activation of a multiple zones is prevented by checking for a minimum interval between the vertical offsets of fingertips in different zones. If this condition is not met, the average of the vertical fingertip offsets is used to choose a single modifier zone. Distributing the fingertips into different zones does imply some finger twisting, but does not cause as much hand drift as reaching for multiple modifier keys on the periphery of the key layout.

In an alternative embodiment of this invention, different modifiers can be activated in a manner independent of any zones or the overall hand position on the surface. Rather, they are distinguished by different horizontal and vertical separations between the four fingertips performing the chord. Shift, for example, might be activated by the normal relaxed placement of four fingertips in a row with about 2 cm (¾") separating the fingertip centers. Ctrl would then be activated by placing the fingertips stretched along the row with an average 3 cm (1⅛") separation between them. A third modifier could be activated by splitting the fingertips vertically into two rows a couple cm apart. This aspect of the invention is most useful for non-typing situations where hand motions are not focused around a default position along home row. With this aspect, a hand can, for instance, apply different modifiers to mouse clicking activity on the opposite hand without having to reposition itself within certain modifier zones.

A primary objective of the present invention is to provide an apparatus capable of detecting four-fingertip modifier chords that obviate the awkward pinky or thumb reaches previously needed to strike and hold modifier keys.

Another objective of this invention is to prevent spurious modifier chord activation when the user is slowly relaxing into a hand resting chord, but does not initially have the thumb on the surface.

A further objective of this invention is to allow use of the Shift modifier chord for capitalization across words without applying the Shift modifier to intervening Space or BackSpace key activations by thumbs.

Yet another objective of this invention is to establish different modifier zones across, above, and below the home row of keys that can be utilized to apply different modifiers.

A further objective of this invention is to support simultaneous activation of multiple modifiers with the same hand when the fingertips of the modifier chord are clearly distributed among different modifier zones.

Another objective of this invention is to support selection of different modifiers from the relative arrangement of fingertips within a modifier chord rather than their placement within any particular zone on the surface.

DETAILED DESCRIPTION OF THE INVENTION

Figure 1:
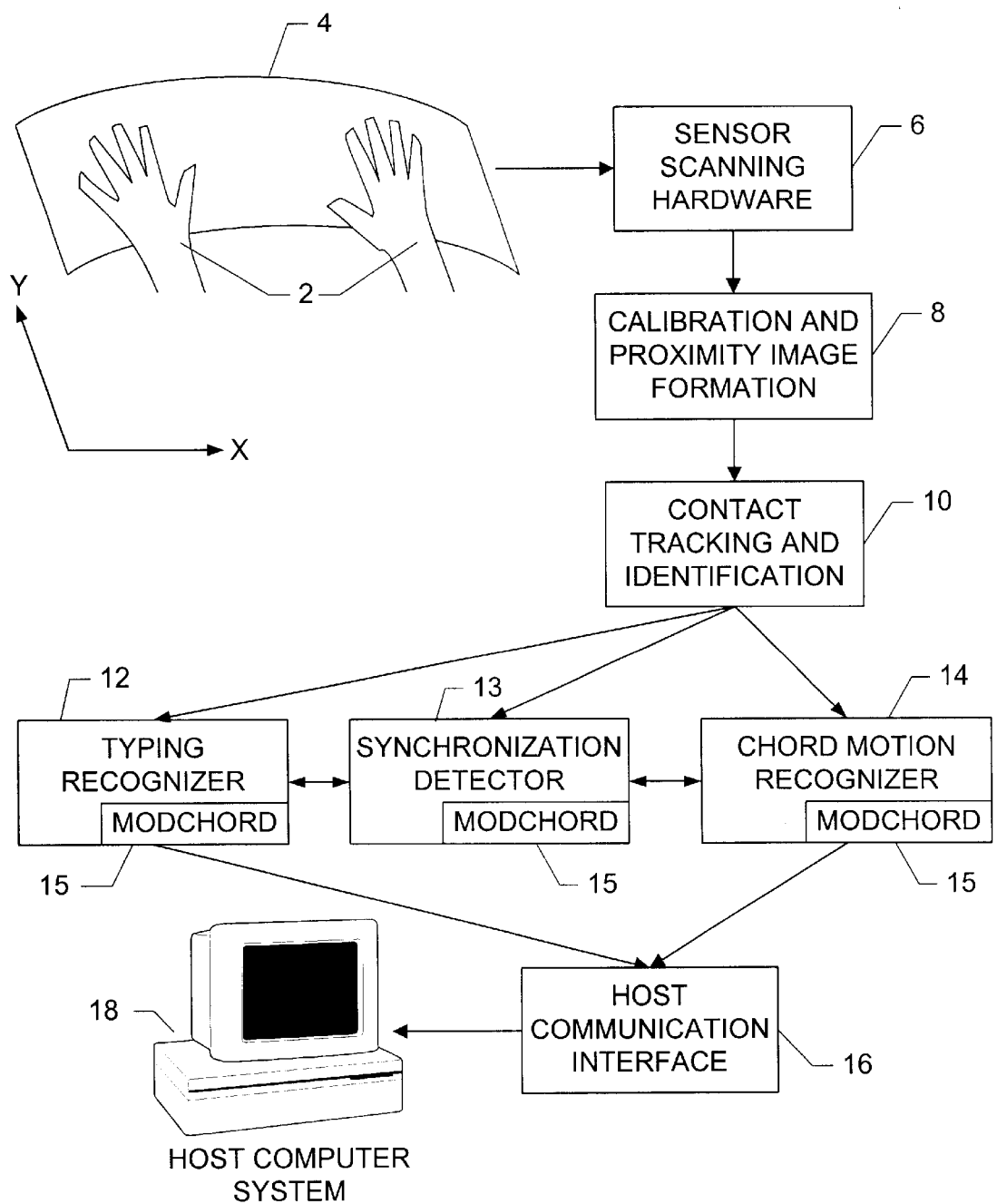
FIG. 1 is a block level diagram of a multi-touch system with typing, chord motion, and modifier chord recognition according to a preferred embodiment of the present invention.

In the preferred embodiment, the typing recognition methods of this invention are utilized within a multi-touch system like that shown in FIG. 1. The sensor scanning hardware 6 detects touches by fingers 2 on the touch surface 4. The proximity image formation 8 and contact tracking and identification 10 modules determine the touch timing and surface coordinates and report these to the typing recognizer 12. The typing recognizer decides which keys the user intended to press and tells the host communications interface 16 to send those keys to the host computer 18. The chord motion recognizer module 14 that interprets lateral sliding of multiple fingers as pointing or gesture input and effectively disables the typing recognizer for such touches. The synchronization detector 13 searches for simultaneous presses or releases of multiple fingers, thereby aiding in detection of chord slides, chord taps, resting hands, and, for the purposes of this invention, modifier chords. Prior art embodiments of all modules in FIG. 1 except the MODCHORD subdivisions 15 are described in related U.S. pat. app. Ser. No. 09/236, 513 by Westerman and Elias. That application is incorporated herein by reference in its entirety. It discloses techniques for detection of chord taps and generation of single commands or button clicks therefrom. It also discloses methods to detect and apply conventional modifier key touches. However, unlike the present invention, that application does not teach recognition of modifier chords nor associated techniques for selecting modifier types according to the zone a chord falls within or the template arrangement best matching its finger arrangement, canceling the chord in response to thumb resting, committing a modifier chord upon reception of subsequent modifiable input activity, nor sustain of modifier signals through typing by both hands until no fingers from the modifier chord remain touching. The detection 56, cancellation 60, and application 62 processes embodying the improvements of the present invention are widely distributed across the typing recognizer 12, synchronization detector 13, and chord motion recognizer 14 modules so as to efficiently apply modifier chords to the other input activities that these modules recognize. Thus these modifier recognition processes are collectively represented in FIG. 1 by the MODCHORD subdivision 15 of each module. The exact relation of the modifier chord recognition processes to each larger recognition module will be made apparent from the following detailed description. U.S. pat. app. Ser. No. 09/681,146 by Westerman further describes an improved typing recognizer 12 that compares touch geometry to key sequence candidate geometry, but its improvements do not bear directly on modifier chord recognition.

Those skilled in the art will recognize that the modifier chord recognition method disclosed herein could be utilized with any sensing device that accurately reports the lateral position of multiple fingertips on a surface. Likewise, the modifier chord recognition software need not reside within the sensing device. It could just as easily execute within the host computer system, or the host computer system and sensing device might be combined such that the same microprocessor executes finger tracking, modifier chord recognition, and user application software. Those with ordinary skill in the art will also be aware that some keyboard interfacing protocols use edge-signaling of key activation state while others use level-signaling. For instance, keyboards with the legacy PS/2 interface for IBM-compatible PCs will transmit a press keycode only upon initial activation of a modifier keyswitch and will send a corresponding release keycode immediately after the finger lifts off the switch. Thus the press/release keycodes are only transmitted at edges or transitions in the state of the keyswitch. Keyboards communicating via the more recent USB (Universal Serial Bus) protocol use level-signaling: as long as a keyswitch is depressed, the keyboard regularly and repeatedly sends the corresponding keycode to the host computer. There are no distinct press and release keycodes. This disclosure will use the edge-signaling, press/release terminology throughout to describe transmission of modifiers to the host computer 18, but it will be apparent to those of ordinary skill in the art how any edge-signaling implementation of the host communications interface 16 can be converted to level-signaling and remain well within the scope of this invention.

Figure 2:
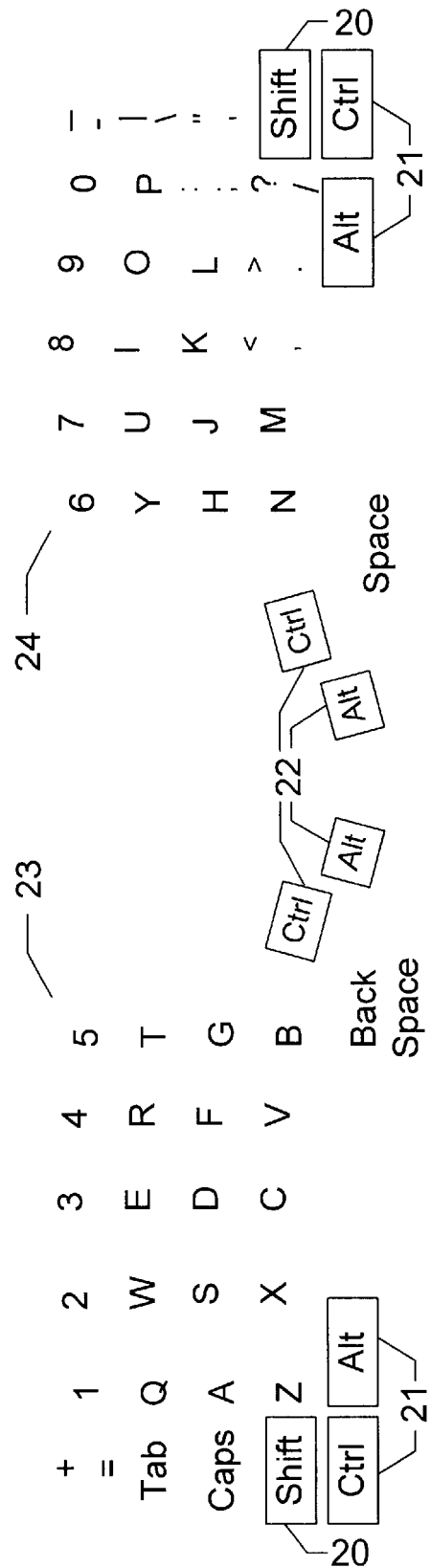
FIG. 2 is a diagram of a split QWERTY key layout with prior art modifier keys that are struck by the pinky or thumb.

The key layout illustrated in FIG. 2 exemplifies prior art placement of modifier keys 20, 21, and 22 such that they can be reached by the thumb or pinky fingers. This diagram shows a QWERTY layout split into left 23 and right 24 halves such that Ctrl and Alt modifier keys 22 can be placed between the split halves within easy reach of either thumb. Non-split layouts are more likely to place Ctrl and Alt modifier keys 21 on the bottom row of the layout where they are most likely to be operated by the pinkies. Whether split or not, most layouts keep the Shift modifier keys 20 diagonally below the home row key ('A' or ';') that the pinky normally rests upon. Though these Shift keys 20 are not that far from home row, the pinky motion needed to reach and hold them down is particularly awkward.

Figure 3:
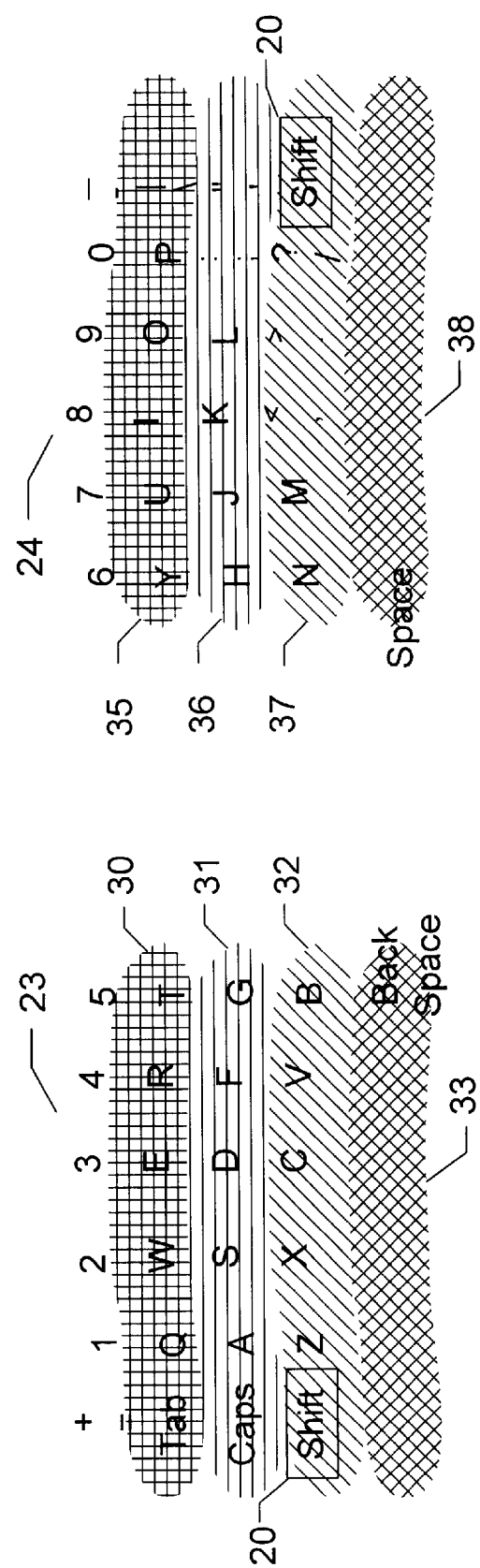
FIG. 3 is a diagram of a split QWERTY key layout with a different chord modifier zone overlapping each row of keys according to a preferred embodiment of the present invention.

In contrast to prior art FIG. 2, FIG. 3 shows the chord modifier zones 30–34 and 35–37 of the present invention as different hatches ranging across each row of the key layout. In an actual product, the different modifier zones would be indicated on the touch surface by different background colors rather than different hatches. According to the preferred embodiment of the present invention, simultaneous touchdown of four fingertips within one of these zones will cause subsequent touch activity to be modified just as if a modifier key was being held as long as the modifier chord is not fully lifted or canceled by an improper thumb touch. Notice that a hand resting on the home row 'ASDF' or 'JKL;' keys can activate any of its modifier zones by pure finger flexion or extension, eliminating the awkward twists needed to reach conventional modifier keys. Notice also that the modifier zones are not horizontally restricted to the 'ASDF' or 'JKL;' key columns, so the typist need not worry about horizontal hand alignment when performing a modifier chord. The key layout improved with modifier zones may retain the conventional Shift modifier keys 20 near the pinky for the convenience of novices who have not yet learned to perform modifier chords, but experience with the invention has shown that typists rarely use these conventional modifier keys once they have learned the more convenient modifier chords. Since capitalization is needed so frequently, the modifier zones 31 and 36 along the left and right home row of keys are preferably assigned the Left Shift and Right Shift modifiers. The modifier zones 30 and 35 above home row are preferably assigned the Left Ctrl and Right Ctrl modifiers, and the zones 32 and 37 directly below home row are preferably assigned the Left Alt and Right Alt modifiers. Modifier zones 33 and 38 can be assigned any remaining modifiers such as Meta, Diamond, Windows, or Open Apple supported by the host computer 18's particular operating system. Those skilled in the alternative key layout arts will realize that modifier zones can be established just as easily over Dvorak, non-split, or non-English key layouts. Also, those skilled in the foreign keyboard arts will realize that the modifier zones could alternatively be assigned to Asian language modifiers like Kana or Kanji and remain well within the scope of this invention.

Figure 4:
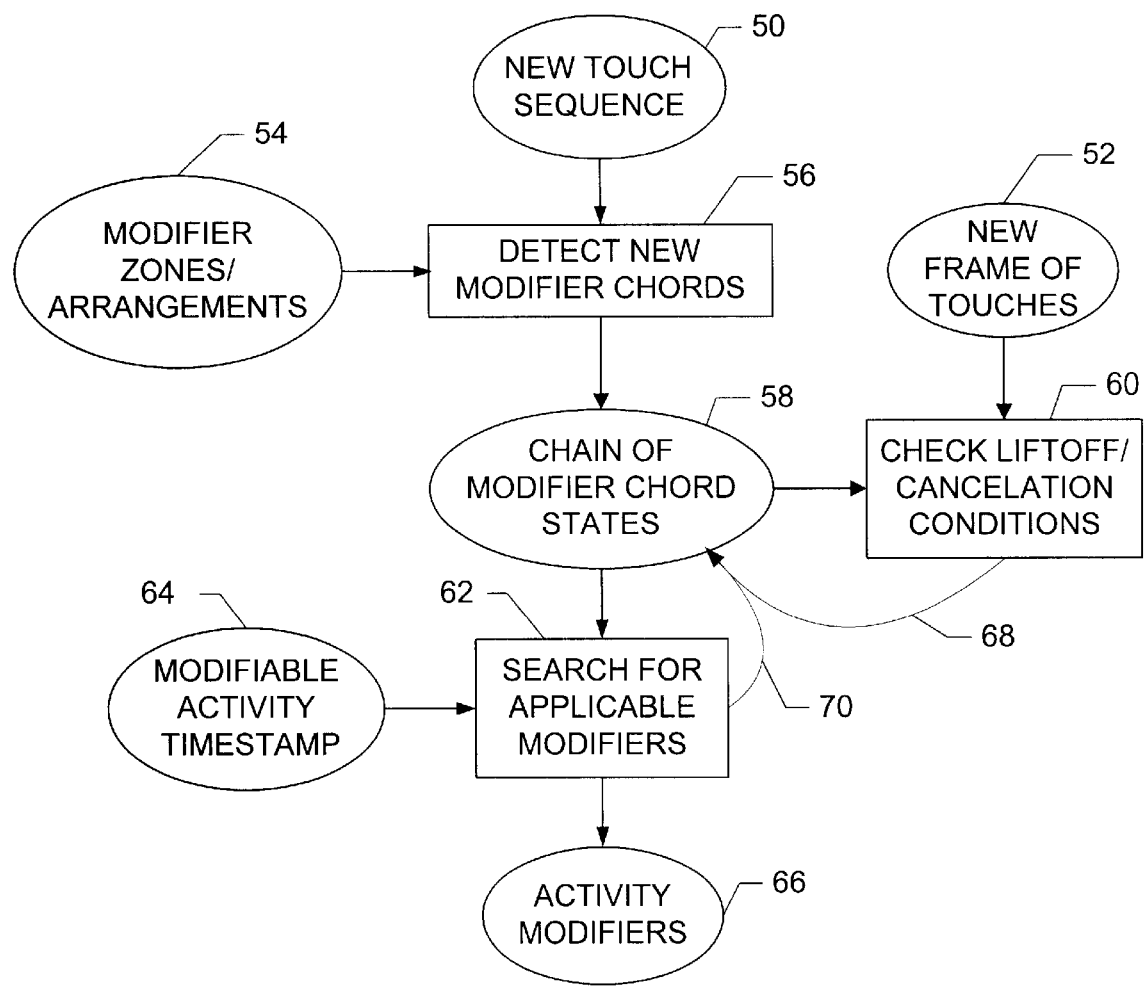
FIG. 4 is a data flow diagram showing the relation of the processes and data that the present invention uses to detect and apply modifier chords in its preferred embodiment.

In the preferred embodiment of the present invention, modifier chord recognition is split into three processes as shown in FIG. 4. Process 56, detailed in FIG. 8, detects new modifier chords by monitoring the incoming touch sequence 50 for touchdowns by the four fingertips of one hand that are simultaneous and also lie within one of the zones or arrangements specified by the configuration data 54. This process only needs to execute each time a new finger touch is detected and appended to the touch sequence, not for image frames from the sensor scanner 6 that contain no new surface contacts. The incoming touch sequence 50 consists of a chain of touch data structures 80 (detailed in FIG. 5) ordered by touchdown times 85. The configuration data structures 100 and 520 that store the modifier zones or arrangements 54 are detailed in FIG. 7 and FIG. 17. If it detects a new modifier chord, process 56 will allocate a corresponding modifier state data structure 90 (detailed in FIG. 6) and append it to the modifier chord state chain 58. The liftoff/cancellation detection process 60 (detailed in FIG. 14) checks each new image frame or sensor array scan for absence of all four fingertips or presence of the thumb from any hand with a modifier chord pending in the state chain 58. Upon detection of one of these conditions, the liftoff/cancellation process 60 uses feedback path 68 into the modifier state chain 58 to record either the chord liftoff time 94 or chord cancellation 96. It may also send corresponding modifier release signals to the host computer 18 through the host communication interface 16. The third process 62 searches the modifier state chain 58 for uncancelled modifier chords roughly coincident with modifiable input activity. If this process finds any applicable modifier chords whose press signals have not already been sent, it will cause the host computer interface 16 to send their modifier press signals to the host computer 18. This search process 62 is typically called by the typing recognizer 12, synchronization detector 13, or chord motion recognizer 14 with the timestamp 64 of the modifiable input activity right before such activity itself is transmitted through the host communication interface 16.

Figure 5:
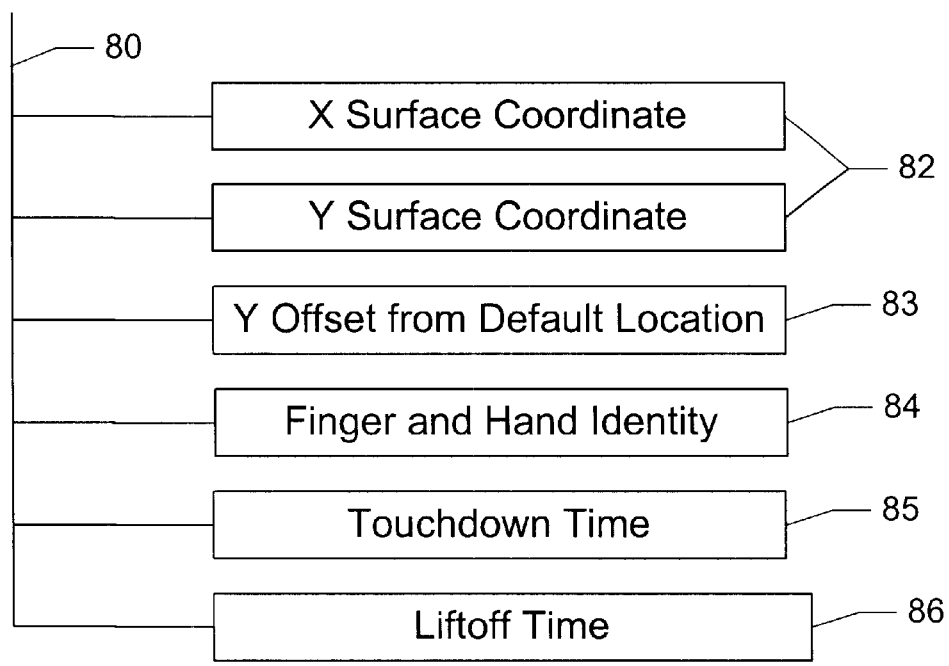
FIG. 5 illustrates the contents of the touch data structure used to store touch location, identity and timing and, when formed into a chain, represent a sequence of touches.

FIG. 5 lists basic parameters needed for each touch data structure 80 to support detection of new modifier chords 56. A ring or chain of such data structures ordered by touchdown time 85 represents a touch sequence by one or more fingers. Since palm touches are to be ignored by all recognition processes, they can be left out of the touch sequence 50. Each touch data structure 80 must contain the touch's x and y surface coordinates 82 as reported by the touch sensors 6. These should estimate the center of the touch, which for proximity or pressure sensors is typically computed as the centroid of fingertip flesh contacting the surface. The y offset from default finger location 84 will be computed in FIG. 9 to improve the accuracy of modifier zone selections. To help determine whether a touch sequence represents the four fingertips of a modifier chord, each touch data structure should have a copy of the hand and finger identity 84 estimated for the touch by the contact tracking and identification module 10. To help detect synchronization of multiple touches, the touch data should also include the finger touchdown time 85, also reported by the contact tracking and identification module 10. While the touch liftoff time 86 is a useful indicator of individual modifier key release, the modifier chord liftoff time 94 is not derived from the individual liftoff times 86 of the touches originally forming the chord. This is because in its preferred embodiment the present invention beneficially allows individual fingertips of a modifier chord to lift temporarily and touch again to type while other modifier chord fingertips remain touching, as is shown in FIG. 12. These temporary finger lifts will establish the touch liftoff times 86 for the original touches forming the chord but may not be indicative of final chord liftoff since the temporarily lifted fingers may touch again to sustain the chord while other modifier fingertips lift to type, and so on.

Figure 6:
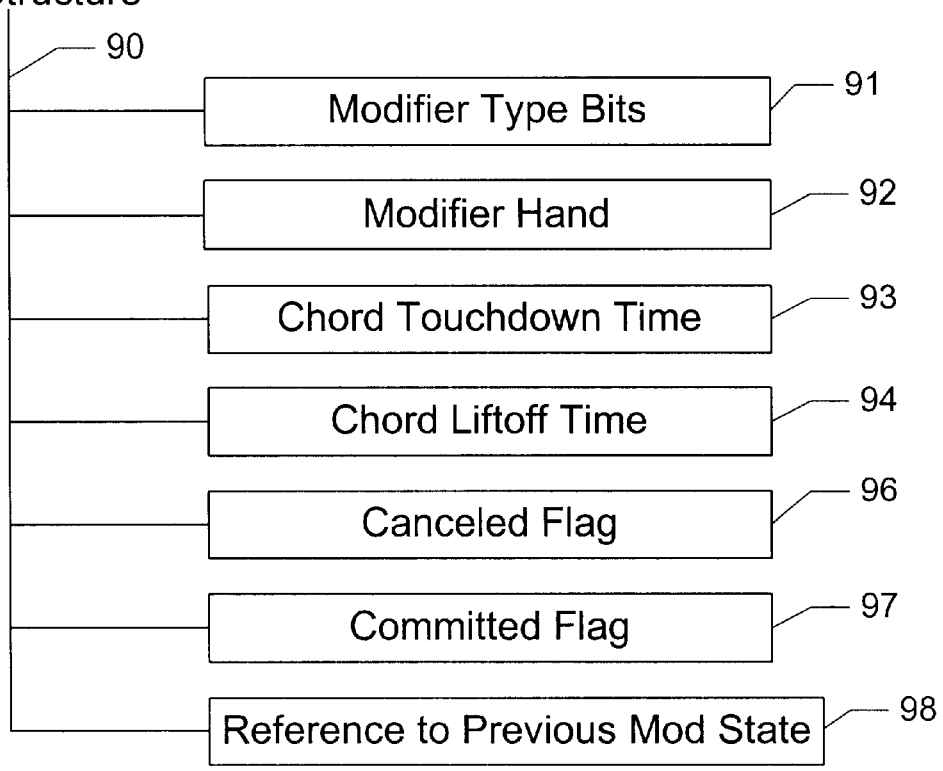
FIG. 6 illustrates the contents of the data structure used to keep track of a modifier chord's state through its life cycle of being canceled or applicable and eventually lifted.

FIG. 6 lists the parameters that keep track of a modifier chord's state 90 once it is initially detected by process 56. The modifier type bits 91 encodes which modifiers, e.g. Shift, Ctrl, or Alt, the chord's fingertip placement has selected. The contents of these bits will be determined by either the modifier zone selection process of FIG. 10 or the fingertip arrangement selection process of FIG. 18. The hand field 92 indicates which hand performed the modifier chord. The chord touchdown time 93 is set by the new chord detection process 56 as the minimum of the touchdown times 85 of the original four fingertip touches firming the chord. As discussed previously, the chord liftoff time 94 should not be computed as the maximum of the original touch liftoff times 86. Instead, the liftoff and cancellation check process 60, FIG. 14, will set the chord liftoff time 94 as the first time after chord detection that none of the four fingertips from the chord are found to be touching the surface. The canceled flag 96 is set by the liftoff and cancellation check process 60 if the chord fingertips slide substantially or a thumb from the chord's hand touches before the chord has committed. When set, this flag causes the applicable modifier search process 62 to ignore the modifier chord. The committed flag 97 is set once a modifier chord is actually applied by the applicable modifier search process 62 to outgoing typing or clicking activity. Once set, this flag prevents the chord from being canceled except when fully lifted.

Figure 7:
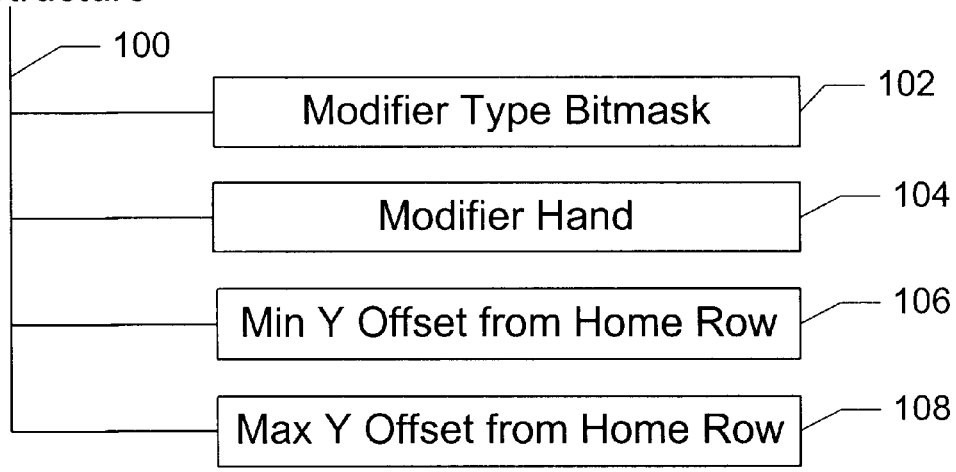
FIG. 7 illustrates the configuration parameters used in the preferred embodiment to represent a single modifier zone.

FIG. 7 shows the data structure 100 and parameters used to configure each modifier zone. Here, the modifier type bitmask 102 is a set of flags indicating which of the Shift, Ctrl, Alt or other modifiers are assigned to the zone. Note that this bitmask implementation allows multiple modifiers, such as Shift Ctrl, to be assigned to the same zone if the user so desires. The hand field 104 can restrict the zone to the left 23 or right 24 half of the key layout, but no other horizontal alignment restriction is necessary. The min 106 and max 108 Y offsets from home row determine the vertical range of the modifier zone. Note that no extra configuration parameters are necessary to arch the zones along each row, should the key rows be so arched, because the zone selection process of FIG. 10 will compare these Y offsets with each fingertip's vertical offset relative to the position of the home row key the finger normally rests upon, also know as the fingertip's default position. Thus the modifier zone will automatically arch to match any arch in the home row key locations.

Figure 8:
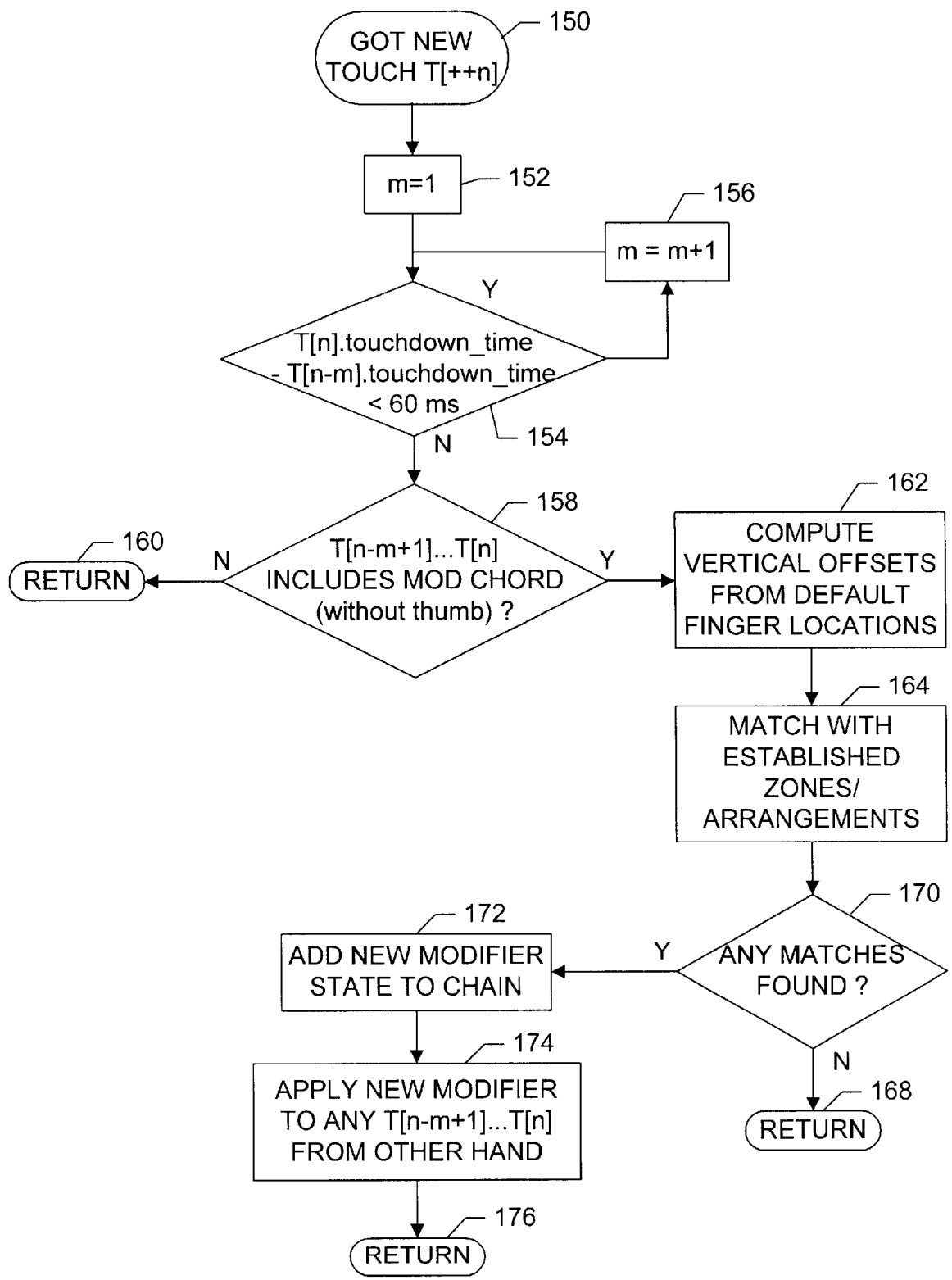
FIG. 8 is a flowchart of the process that detects new modifier chords.

The new modifier chord detection process is shown in FIG. 8. This process begins whenever a new finger touch is detected by the contact tracking and identification module 10. Step 150 increments the latest touch index n and stores the touch's parameters 80 at the n th location of the touch sequence array T[ ]. Steps 152, 154, and 156 scan backward m touches in the touch sequence trying to find the largest synchronized subsequence that includes the new touch T[n]. Decision diamond 154 judges synchronization by testing whether the m th previous touch T[n−m] contacted the surface within a synchronization interval of about 60 milliseconds of the new touch T[n]. Note that the typing recognizer 12 should not generate signals to the host corresponding to an individual touch over a key until sufficient time has passed without subsequent touches on the same hand that this synchronization detection loop can be certain that the touch is not synchronized with later touches. Thus the typing recognizer 12 must delay key output about 60 ms from finger touchdown or be prepared to erase or undo keys from touches later found to be part of a chord. Once decision diamond 154 finds a previous touch too old to be synchronized with T[n], it passes on the largest synchronized subsequence as T[n−m+1] . . . T[n].

Decision diamond 158 then examines the finger and hand identity 84 of each synchronized touch looking for a combination of identities from one hand that matches any combination allowed for modifier chords. In the preferred embodiment, only the 4 fingertip combination, index, middle, ring and pinky, excluding the thumb, is used for modifier chords. To prevent duplicate detection of the same modifier chord, decision diamond 158 must require the newest touch T[n] to be one of the modifier chord fingertips. Otherwise, any synchronized touches intervening from the hand opposite a modifier chord combination do not affect the modifier chord, but the modifier chord may eventually apply its modifiers to them as in touch 370 of FIG. 13. If the synchronized subsequence does not contain a modifier chord combination from either hand, the process returns 160 until the next new touch warrants a renewed detection attempt.

Assuming a modifier chord combination from one hand is found within the synchronized subsequence, block 162 forms a touch array MT[ ] indexed by finger identity containing only the modifier chord touches. As further described in FIG. 9, block 162 also computes each touch's vertical offset from its corresponding home row key or default location. Block 164, further described in FIG. 10, checks whether the chord has been performed within any of the established modifier zones. In an alternative embodiment, block 164 may check the arrangement of fingertips within the chord as further described in FIG. 18. Decision diamond 170 ends new modifier detection through step 168 if the chord matches none of the established zones or arrangements. Otherwise, step 172 allocates a new modifier state 90, setting the modifier type 91 according to that of the selected zones or arrangement, setting the modifier hand 92 to the detected chord's hand identity, and setting the chord touchdown time 93 as the minimum of the touchdown times 85 of the synchronized touches forming the chord, and setting the chord liftoff time 94 to 0 pending full liftoff detection. Step 172 also appends this new modifier state to the state chain 58 that may already contain state from other chord or key modifiers being held by the opposite hand. New modifier detection returns at step 176, and responsibility for canceling the modifier chord or applying it to modifiable input activity passes to processes 60 and 62.

Figure 9:
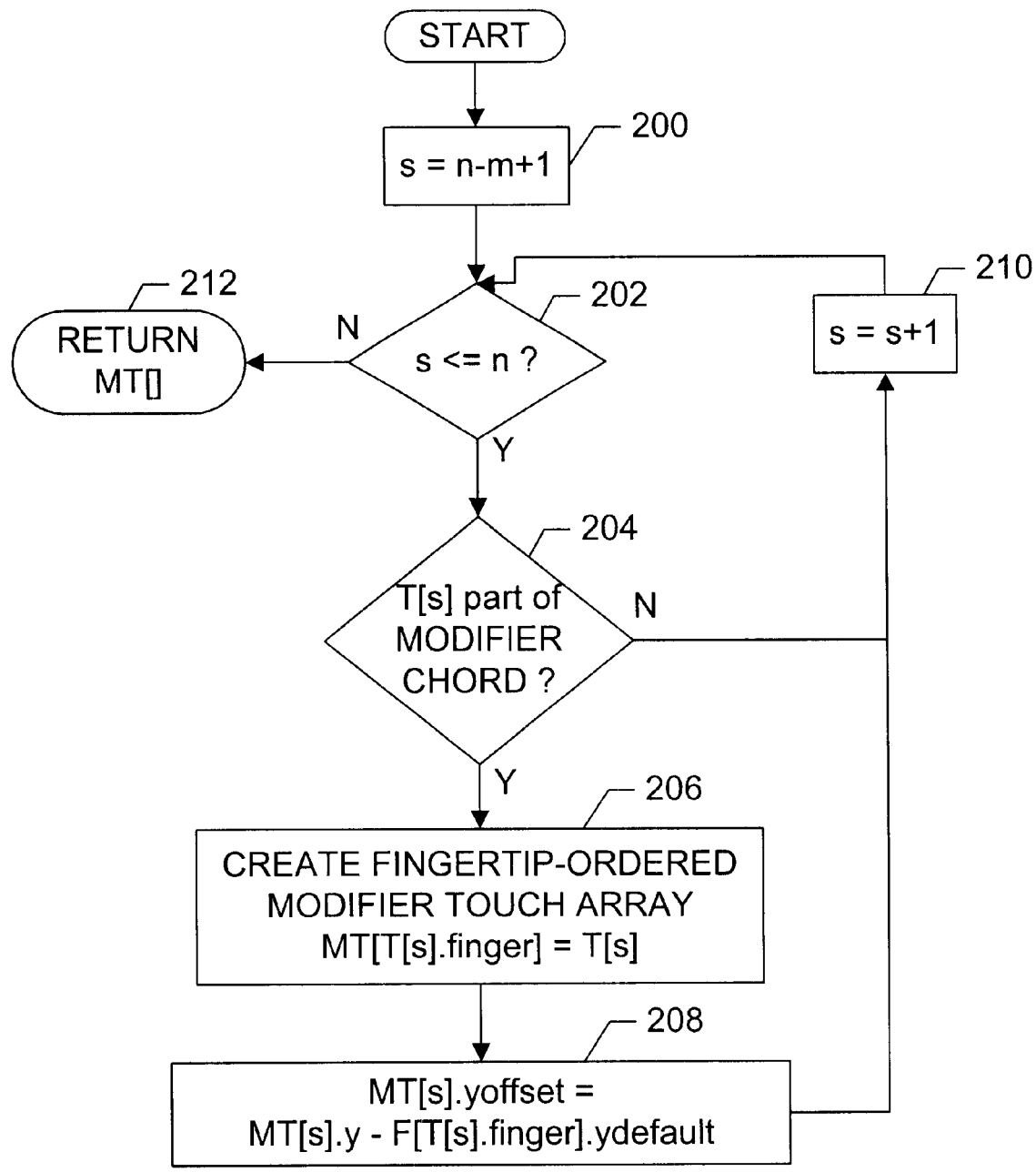
FIG. 9 is a flowchart detailing computation of fingertip vertical offsets from the default fingertip locations.

FIG. 9 shows the details of vertical offset computation block 162. Step 200 starts the sync index s at the oldest synchronized touch and loops 210 through the synchronized subsequence. Decision diamond 204 separates out the modifier chord touches from any opposite hand touches. For the convenience of the modifier zone or arrangement matching process 164, step 206 stores each modifier chord touch into the touch array MT[ ] in order of their finger identity 84. Step 208 computes each modifier touch's vertical offset from the default or resting location of its corresponding finger. For key layouts such as 23 and 24 with an arch across the home row keys, these default locations should be the locations of the 'ASDF' and 'JKL;' keys. These vertical offsets help the modifier zone matching process 164 efficiently compensate for the natural arch across the fingertips. Decision diamond 202 breaks the loop and returns through 212 once the whole synchronized subsequence has been processed.

Figure 10:
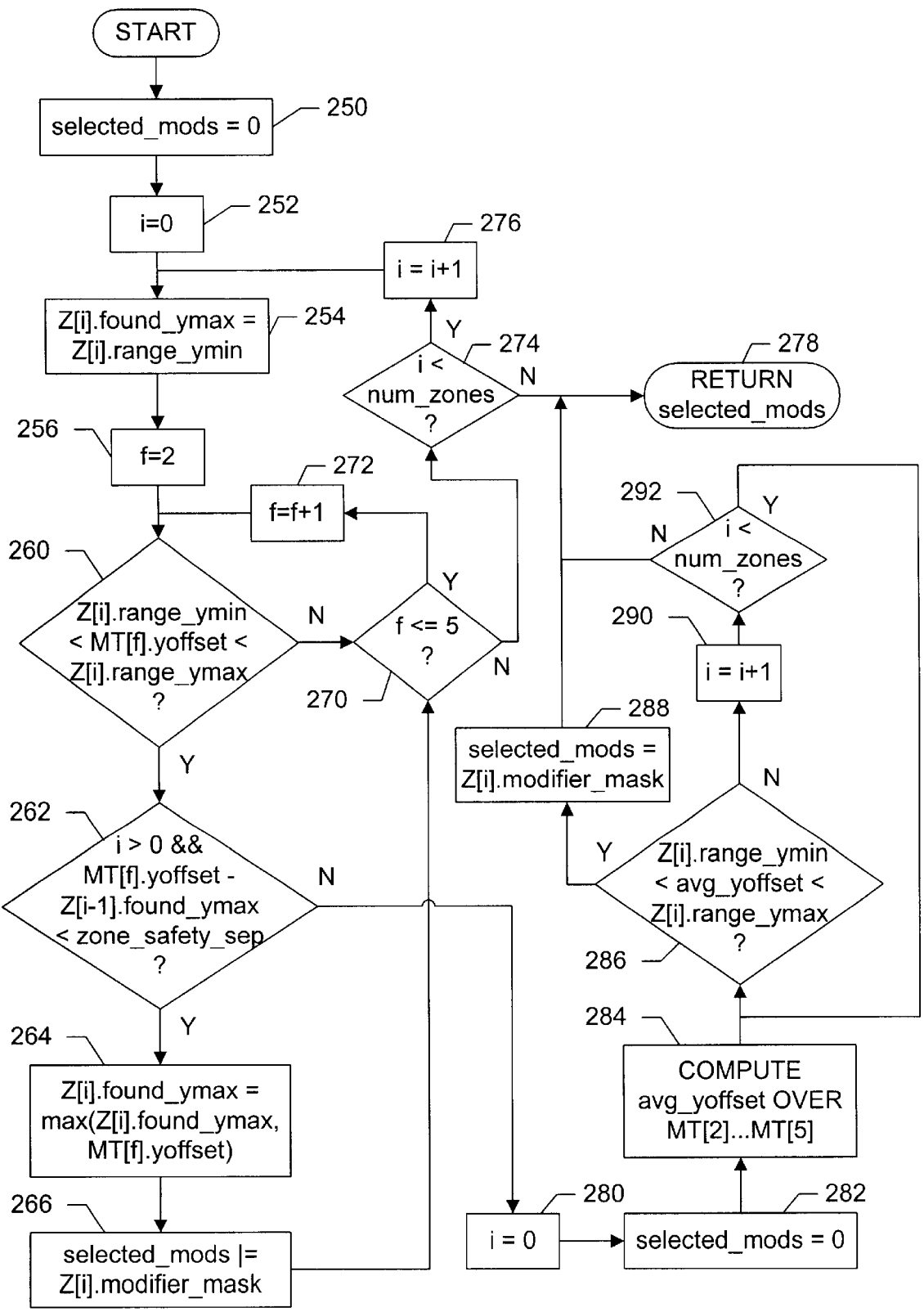
FIG. 10 is a flowchart of the preferred embodiment of the process that detects which modifier zone(s) a chord is selecting.

FIG. 10 discloses the preferred embodiment of block 164, a search for modifier zones 100 that the modifier chord fingertips lie within. The array Z[ ] of configured zones is assumed to contain only zones for the given modifier chord's hand, and these zones are assumed to be ordered within the array from farthest below home row to farthest above. In this embodiment, the loop of steps 250–276 will attempt to accumulate modifier types from each zone that any of the modifier chord fingertips lies within. If, however, decision diamond 262 finds that the fingertips are not clearly spaced across zones, i.e. if two or more fingertips are vertically bunched together yet straddling the border between two zones, it will direct the loop of steps 280–288 to find the single zone that the average of the fingertip offsets falls within. Step 250 clears selected_mods, the variable whose bits will accumulate the selected modifier types. Step 252 clears the modifier zone index i. Step 254 initializes the max vertical offset for fingertips found in the i th zone, Z[i].found_ymax, to the zone's minimum vertical boundary Z[i].range_ymin. Step 256 initialized the modifier fingertip index f to 2, representing the index finger. Decision diamond 260 checks whether touch MT[f]'s vertical offset from default is within zone Z[i]'s boundaries. If not, decision diamond 270 checks whether all fingertip touches including the pinky have been examined, and if not step 272 advances the fingertip index. If touch MT[f] is within Z[i]'s vertical range, decision diamond 262 checks whether it is vertically separated by at least zone_safety_sep from any touches already found in the zone below. zone_safety_sep should be set to about 1 cm or ⅜". If the touch is clearly separated from any in the zone below, step 264 will bump up Z[i].found_ymax as necessary. Step 266 accumulates the modifier types 91 assigned to Z[i] into the selected_mods bits with a bitwise OR operation. Once all fingertips have been checked against the i th zone, decision diamond 274 will check whether all zones have been tested, and if not advance to the next zone through step 276. If the loop 254–276 gets through all zones without decision diamond 262 finding a fingertip separation violation, step 278 will return the accumulated modifier types selected_mods to decision diamond 170 of FIG. 8.

If decision diamond 262 detects an interzone fingertip separation violation, the zone index i and selected_mods are reset at steps 280 and 282. Step 284 computes from MT[ ]the average avg_yoffset of all four fingertips' vertical offsets. Decision diamond 286 checks whether this avg_yoffset is within the range of zone Z[i]. If not, step 290 advances the zone index to the next zone until either decision diamond 292 finds all zones have been exhausted or decision diamond 286 finds a matching zone. Assuming avg_yoffset falls within the vertical range of one of the zones, step 288 assigns selected_mods the modifier type(s) of that zone, and step 278 returns these. Note that step 278 will return zero if the fingertips are not within range of any zone.

Before describing in detail the liftoff/cancelation detection process 60 and the search for applicable modifiers 70, it will be helpful to define their preferred behavior with the diagramed typing examples of FIGS. 11–13. These timing diagrams display the touchdown (falling edge) and liftoff (rising edge) timings for particular fingers 84 from both hands, where LF5 denotes the left pinky, LF1 the left thumb, RF2 the right index finger, and so on. Fingers not shown in an example can be assumed to be lifted throughout. All synchronized chord touches 300 are assumed to fall within a Shift modifier zone. The vertical dotted lines 93 and 94 identify the chord touchdown time and liftoff time, respectively. Keys transmitted to the host by the typing recognizer 12 in response to asynchronous touches are denoted by the key's symbol encircled. The key symbol is only capitalized if the Shift modifier chord applies to it. The slight space drawn between each touchdown and the corresponding key character circle simply indicates that the typing recognizer must wait about 60 ms after each touchdown before sending a keypress to ensure that the touch will not be part of a chord. The left and right ends of SHIFT ellipses 318, 319, 338, 339, 348, 378, and 388 in the MODIFIER 66 row demarcate the modifier press and release signals that should be sent to the host computer. Thus the Shift modifier is being applied through the duration of each ellipse. The bottom two rows of each timing diagram indicate setting of the modifier state canceled flag 96 or committed flag 97 in response to certain touches.

Figure 11A:
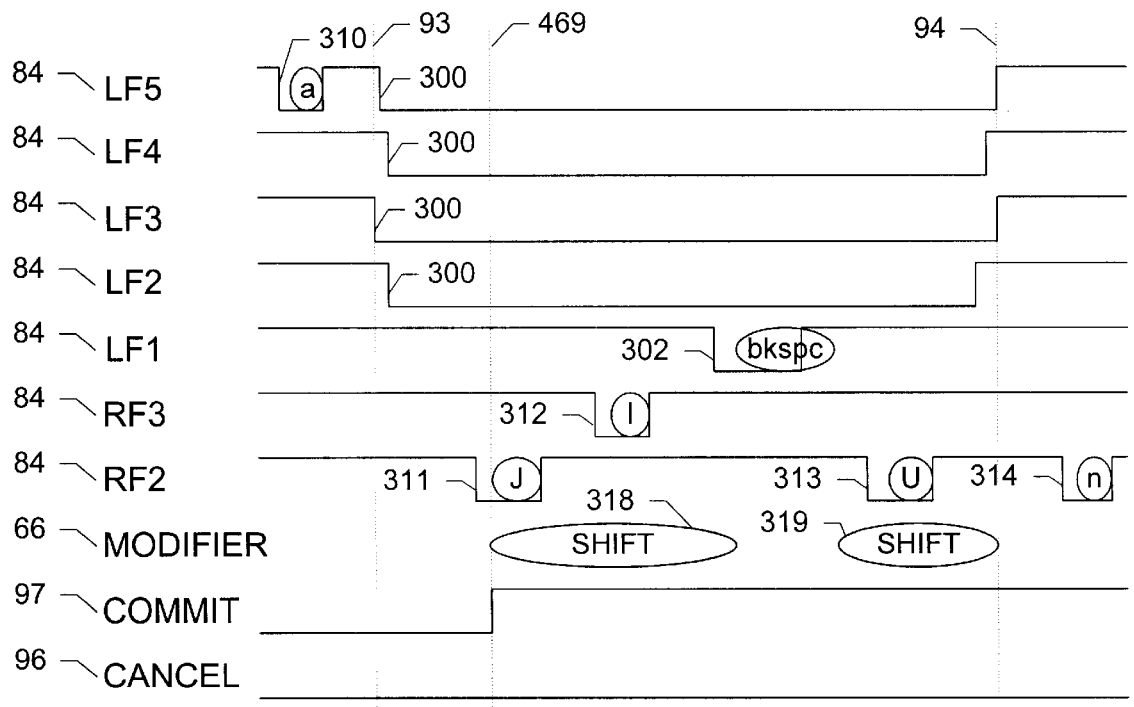
FIG. 11 contains touch timing diagrams showing preferred system responses to thumb touches during modifier chord performance.

FIG. 11A shows typing before, during, and after performance of a left hand Shift chord. The initial 'a' key touch 310 clearly precedes modifier chord touchdown 93 and so should not be capitalized. Notice that the Shift modifier is not sent to the host, committing the chord 469, until the 'J' touch 311 needs to be sent to the host computer, well after modifier chord touchdown. Committing of modifier chords should be thus delayed until transmission of subsequent modifiable activity (the 'J' key touch in this case) to allow for the possibility that the 4 fingertips will begin sliding, suggesting that the typist is actually trying to scroll, or be supplemented with a thumb touch, suggesting the typist is just resting the hand sloppily. This subsequent-touch-activity-dependence of modifier chord committing is unique and novel, as the chord and key taps of the related art commit either on liftoff or sufficient touching time of the tapping fingers themselves, while chord slides for pointing and command gestures commit upon significant lateral motion of the involved fingers. The 'I' touch 312 is also capitalized, but the Shift modifier is temporarily released while the BackSpace key touch 302 is sent to the host, and then Shift is pressed again at 319 in time for the 'U' key touch 313. Decision diamond 463 of FIG. 15 will handle such temporarily release of thumb editing keys such as BackSpace and Space under the assumption that typists usually intend to make quick, unshifted edits but are too lazy to lift and retouch the Shift chord before and after the thumb key activations. The 'n' key touch 314 clearly follows modifier chord liftoff, and therefore should not be capitalized.

Figure 11B:
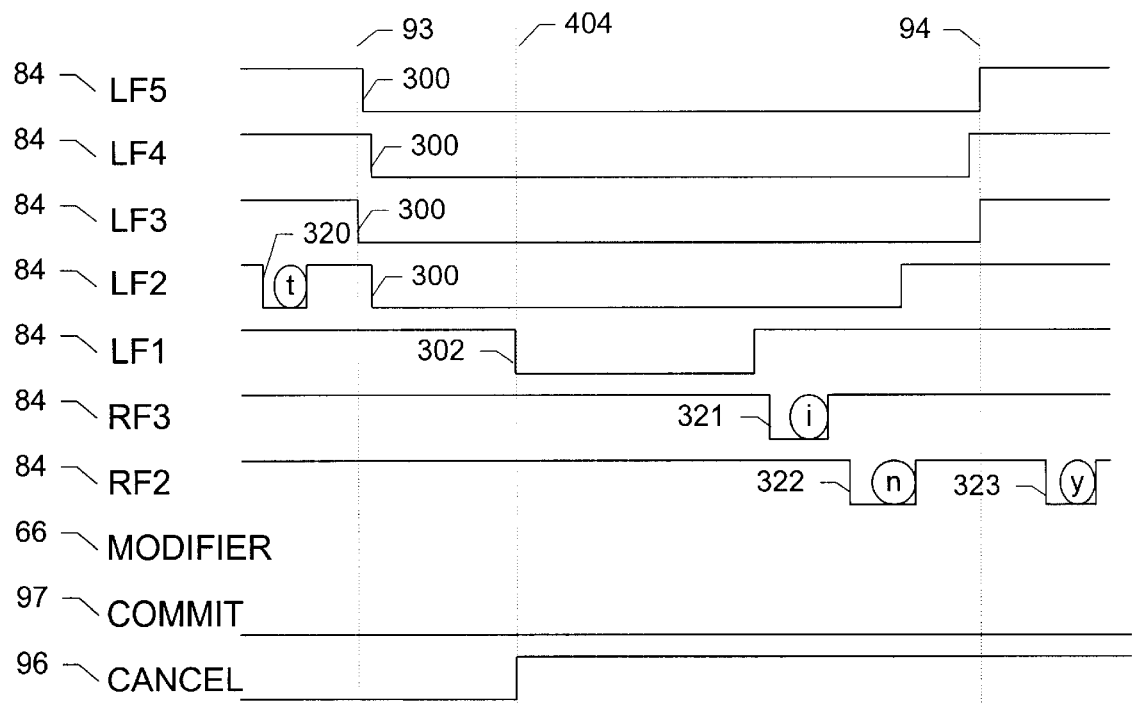

FIG. 11B demonstrates the desired system behavior when the modifying hand's thumb touches down before typing or clicking activity amongst the other fingers has a chance to commit the modifier chord. As before, the touches 320 and 323 before and after modifier chord performance do not get capitalized. However, the 'i' and 'n' key touches 321 and 322 concurrent with the modifier chord do not get capitalized either because the thumb touch 302 preceding them causes the modifier chord to be canceled 404. Whether the thumb touch lands properly on and activates the BackSpace key or whether it lifts back off before the 'i' and 'n' touches is not important. The thumb touch 302 is quite likely the result of sloppy hand resting, and should cancel the modifier chord lest subsequent typing or clicking be shifted unintentionally and have to be undone. Decision diamond 402 of FIG. 14 will implement cancellation due to resting thumb touches.

Figure 12A:
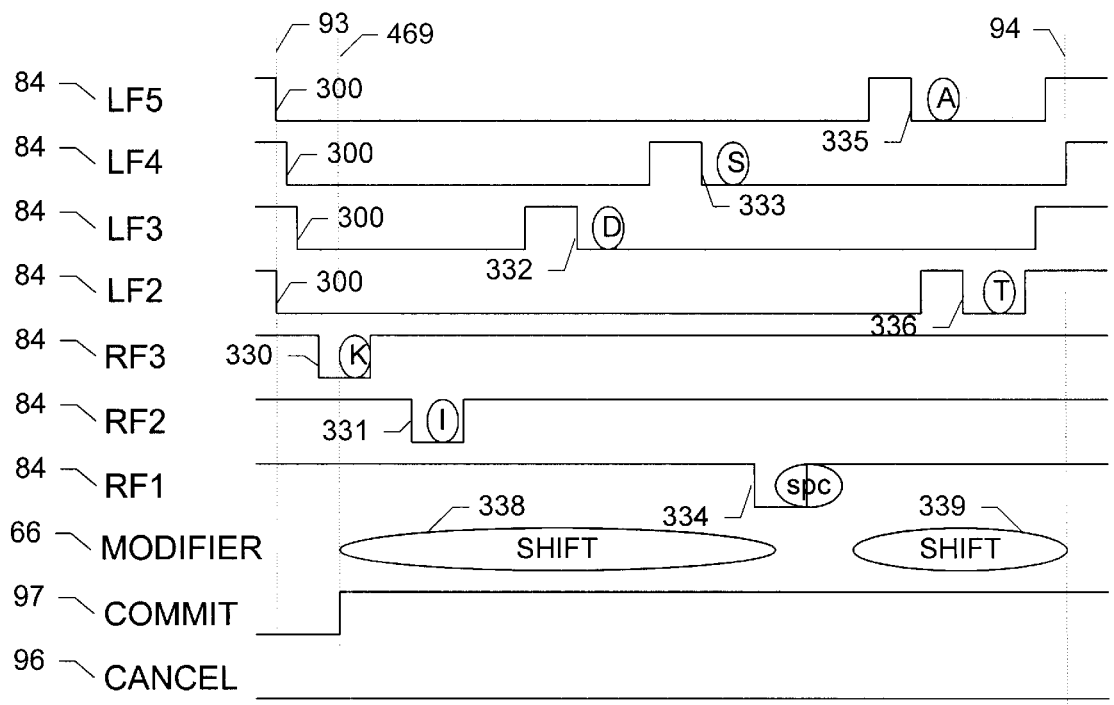
FIG. 12 contains touch timing diagrams that demonstrate sustain of a modifier chord throughout typing touches by the modifier chord fingertips.
Figure 12B:
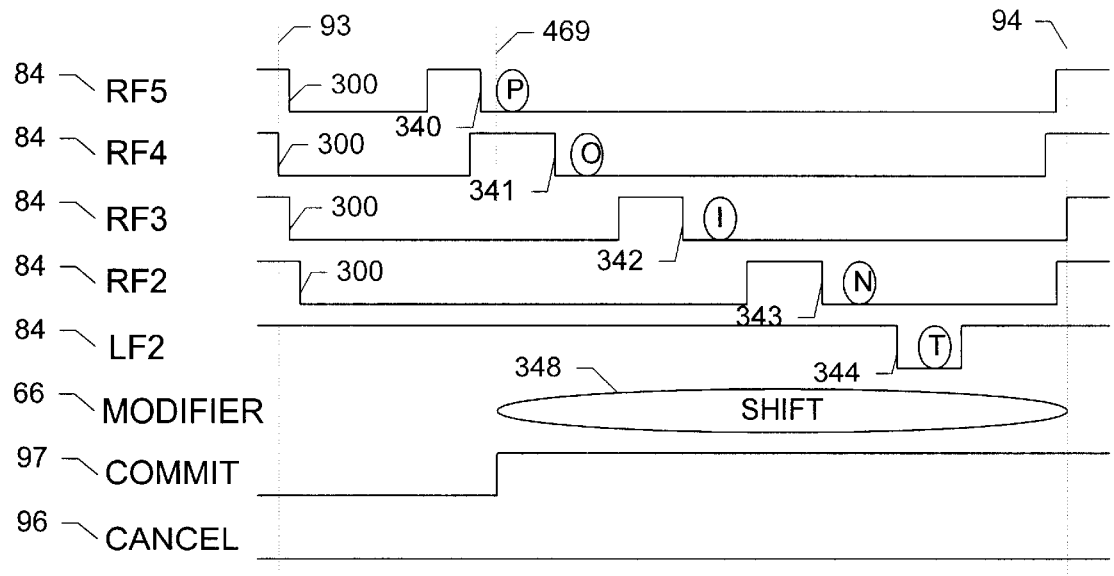

FIGS. 12A and 12B demonstrate how a modifier chord can be sustained through typing by its fingers on its half of the key layout so that whole words can be capitalized from a single modifier chord touchdown. In FIG. 12A, the 'K' key touch 330 on the opposite hand quickly commits 469 the modifier chord and the 'I' touch 331 follows it. To obtain a capitalized 'D' and 'S', the typist need only lift the middle and ring fingertips of the modifier chord and set them down 332 and 333 on those keys one at a time. The typing recognizer must be configured to generate keys from asynchronous touches without waiting for touch liftoff for this to work well, as at least one of the resumed touches 332 and 333 will need to sustain the modifier chord while the pinky and index of the modifier chord temporarily lift to touch the 'A' 335 and 'T' 336 keys. Chord liftoff 94 does not register and cause release of the modifier 349 until the first moment when none of the modifier fingertips are touching. The right thumb Space key touch 334 invokes temporary modifier release as in FIG. 11A. FIG. 12B is similar to FIG. 12A except that the modifier chord is performed by the right hand and committed 469 by a temporary liftoff and 'P' touchback 340 of one of its own pinky fingertip. Touches 341–343 walk through the other modifier chord fingertips ending with a 'T' touch 344 by the opposite hand to spell 'POINT'. This demonstrates that a modifier chord need not always be committed by the opposite hand, which can be useful in situations where only one hand is available for interaction with the touch surface.

Figure 13A:
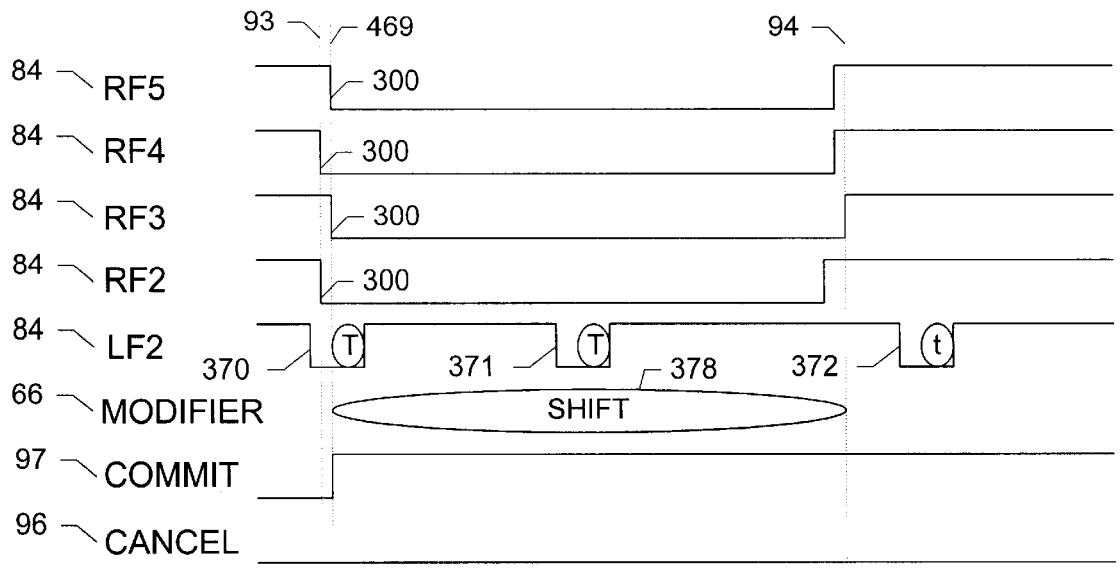
FIG. 13 contains touch timing diagrams for cases in which a modifier chord should be allowed to apply to touch activity that actually occurs slightly before its touchdown or after its liftoff.
Figure 13B:
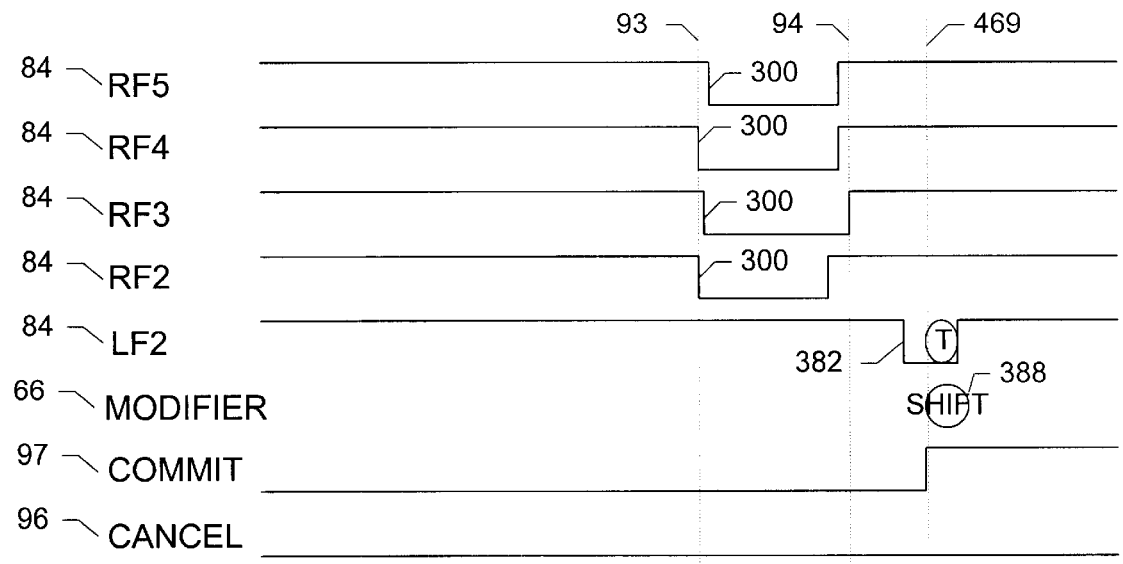

Conventional mechanical keyboards never apply modifier keypresses to keys barely preceding the modifier keypress or just following the modifier key release. The comparative lack of keyswitch action or stroke for touch surfaces lessens the typist's control over the timing between modifier touch and the touches to be modified. FIGS. 13A and 13B demonstrate cases where it is helpful for the system to tolerate some inaccuracies in the timing between modifier chord touches and modifiable key touches. The same techniques also apply to individual modifier key touches on a surface. In FIG. 13A, the touch 370 actually precedes the modifier chord touchdowns 300 but is roughly synchronous with them. Assuming the modifier chord is detected before the key from touch 370 gets sent to the host, the modifier chord should apply to and capitalize the 'T'. Such handling of key touches that very slightly precede modifier chord touches is important for typists who get in the habit of simultaneously touching both the modifier chord and the opposite hand's key to be capitalized. The system will implement it through the sync_slack term of decision diamond 456 in FIG. 15. The 'T' is capitalized again for touch 371 but not for 't' touch 372, which follows chord liftoff. FIG. 13B shows a brief tap of a modifier chord without any coincident key touches. However, 'T' touch 382 does follow shortly after chord liftoff. This suggests the typist was intending to capitalize a single key but, in performing the modifier chord so quickly, synchronized it poorly with the key touch 382 on the opposite hand. It is desirable for the system to compensate by applying the modifier chord in this case even though this means committing 469 and sending the modifier press signal 388 after the chord has actually lifted 94. This is implemented with a non-zero lift_slack in step 464 and decision diamond 466 of FIG. 15

Figure 14:
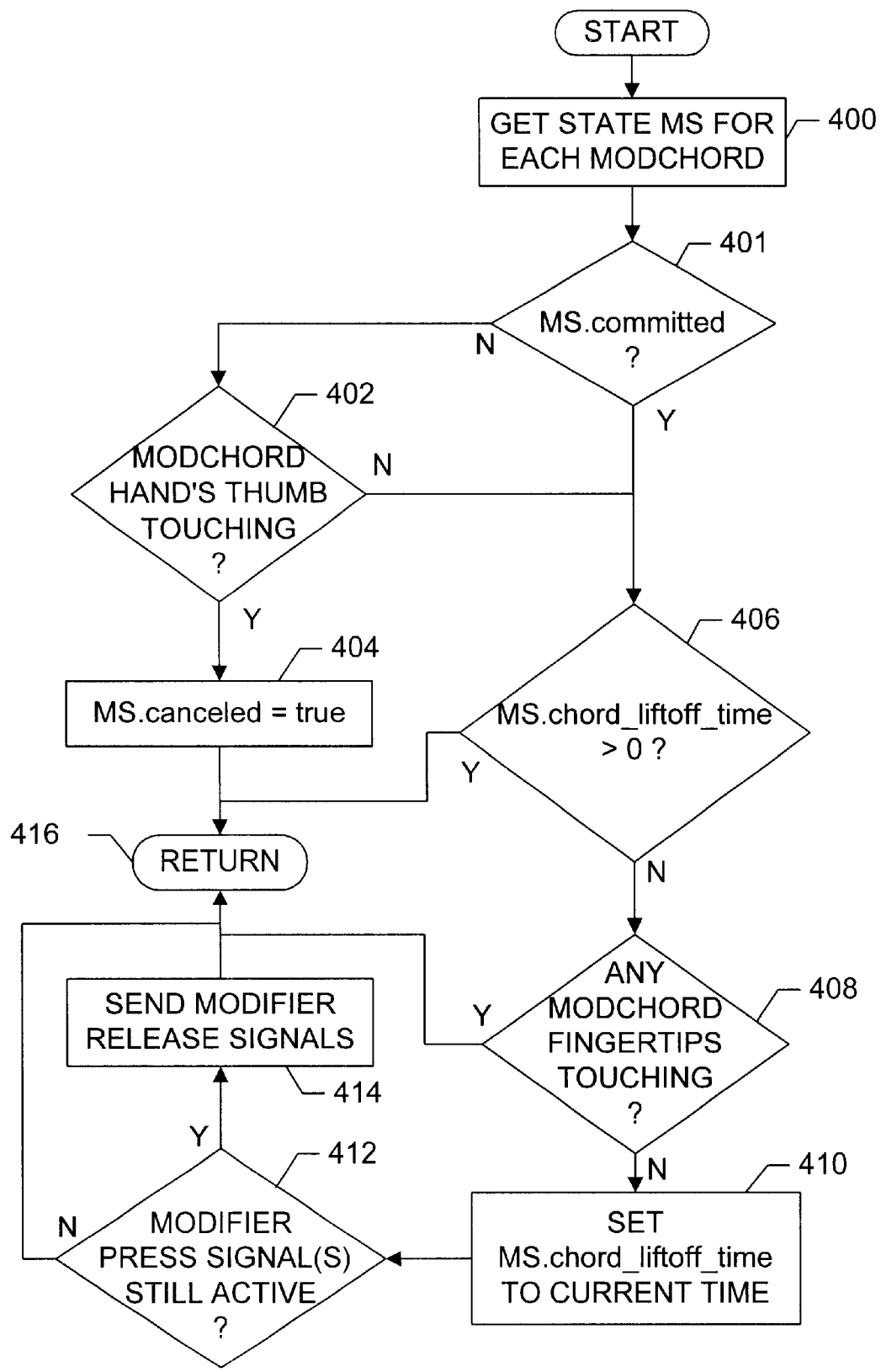
FIG. 14 is a flowchart of the process that detects modifier chord cancellation and/or liftoff according to the present invention.

FIG. 14 details process 60, thumb cancellation and chord liftoff detection. Step 400 denotes that whenever any finger touchdown or liftoff is detected on the surface, this process must be repeated for each modifier chord state 90 in the state chain 58. The combination of decision diamonds 401 and 402 causes the chord to be canceled in step 404 if a thumb touch by the modifier chord's hand is detected before the chord's committed flag gets set. Decision diamond 402 may also decide to cancel a chord if excessive sliding is detected amongst the chord's fingertips. If no such canceling thumb touch is detected, decision diamond 406 checks whether chord liftoff has previously been detected. If not, decision diamond 408 checks the latest sensor image frame 52 for any touches by the modifier chord fingertips. If none are found, step 410 sets the chord liftoff time 94 to the timestamp of the latest sensor image. If liftoff was just detected and decision diamond 412 finds that the modifier types 91 for this modifier state MS are currently pressed for the host, step 414 instructs the host communications interface 16 to send the corresponding modifier release signals. Steps 404 and 410, if executed, thus constitute the feedback path 68 from this process 60 to the modifier state chain 58.

Figure 15:
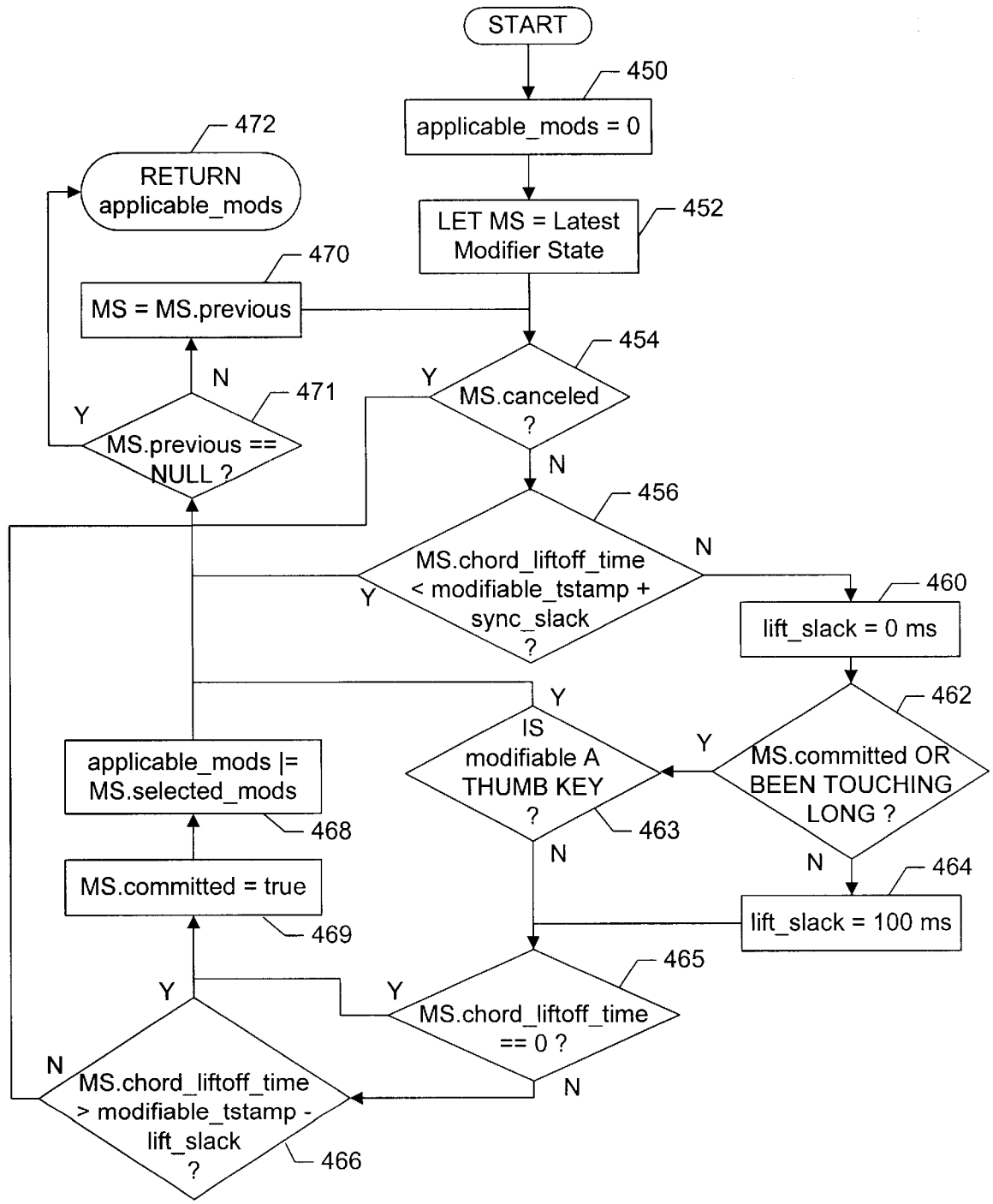
FIG. 15 is a flowchart of the process that searches for modifier chords or keys applicable to modifiable input activity at a given time.

FIG. 15 details the search for applicable modifiers 62 that should always execute just before the typing recognizer 12, synchronization detector 13, or chord motion recognizer 14 transmit any typing, pointing, or clicking signals to the host computer 18. These modules will pass to the search process the modifiable_tstamp parameter, set to the current system time for pointing activity but otherwise to the original touchdown time of the key or click chord touches. Step 450 clears the applicable_mods variable, which will accumulate the bitmasks of the types of modifiers found applicable. Step 452 initializes the modifier state reference MS to the most recent modifier state 90 in the chain 58. Decision diamond 456 causes canceled 404 chords to be excluded from the applicable modifier search. At this point the modifier state for a canceled chord can, if memory resources are scarce, be entirely removed from the state chain 58.

Assuming the chord has not been canceled, decision diamond 456 ensures that modifiable_tstamp does not precede the chord touchdown time 93 by more than a sync_slack of about 60 ms. If the chord more or less precedes the modifiable activity, step 460 establishes a 0 ms default lift_slack. If the modifier chord has only been touching briefly and is not yet committed, decision diamond 462 will cause step 464 to establish a lift_slack of about 100–150 ms, allowing for late modifiable touches as in FIG. 13B. If the chord has been touching a few seconds or has already been committed by other key touches, decision diamond 463 checks whether the modifiable activity is a thumb keypress, and if so, should prevent the modifier chord from applying at least if the chord is a Shift modifier. This will also cause temporary Shift modifier release during thumb key transmission as in Figure 11A and FIG. 12A. Note that this check is not done for briefly touching chords that have not committed yet so as to allow the typist to perform, for example, a single Shift BackSpace macro command using a modifier chord from the hand opposite the thumb key.

The remaining steps ensure that the modifier chord did not lift substantially before modifiable_tstamp. This is certainly true if the modifier chord is still touching and has not yet been assigned a non-zero liftoff time, as detected by decision diamond 465. If the chord has already lifted, decision diamond 466 will need to compare the chord liftoff time 94 with the modifiable_tstamp less the lift_slack to determine whether the modifiable activity occurred before or within lift_slack milliseconds after chord liftoff. Assuming the modifiable activity is found to be sufficiently coincident with the modifier chord, step 469 will set the modifier state's committed flag 97, and step 468 will accumulate the modifier types selected by the applicable modifier state. Thus step 469 constitutes the main feedback path 70 from the applicable modifier search process 62 to the modifier state chain 58. Decision diamond 471 checks whether any older modifier states that might be applicable are left in the state chain 58, and if so step 470 continues the search on the previous modifier state. Once the entire state chain has been examined, the process returns at step 472 the modifier types from the modifier chords found applicable. The host computer interface 16 will compare these newly applicable modifier types to a bitmask of the modifier types already pressed and send additional modifier press or release signals to the host computer as necessary.

Those skilled in the chord keying art will realize that this chord modifier recognition method could easily be adapted to keyboards with conventional mechanical keyswitches, assuming the keyswitch matrix was wired such that the keyswitch scanner circuitry could reliably distinguish coincident presses of four home row keys forming the chord as well as one other key to be modified. However, such an adaptation would not be terribly advantageous because the effort needed to press four mechanical homerow keyswitches simultaneously is just about as straining as the awkward pinky reach for a conventional Shift key. However, when modifier chords are utilized with a proximity sensing multi-touch surface as in the preferred embodiment, holding the chord requires no effort giving modifier chords significant advantage over the pinky reach for a conventional Shift key.

Figure 16A:
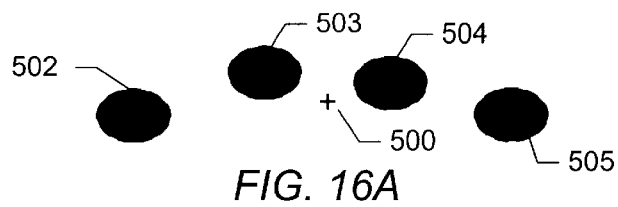
FIG. 16 shows several distinct fingertip arrangements that can be configured to select and apply different modifiers in an alternative to modifier zones.
Figure 16B:
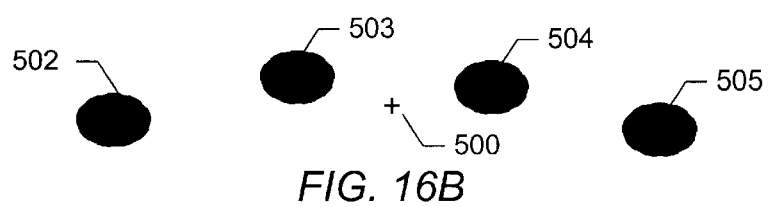
Figure 16C:
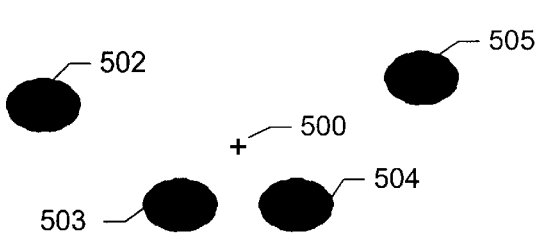
Figure 16D:
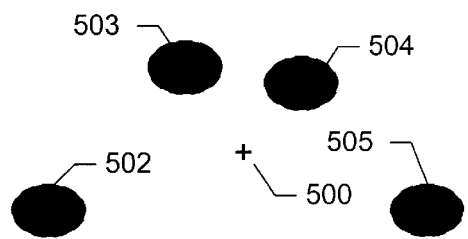
Figure 16E:
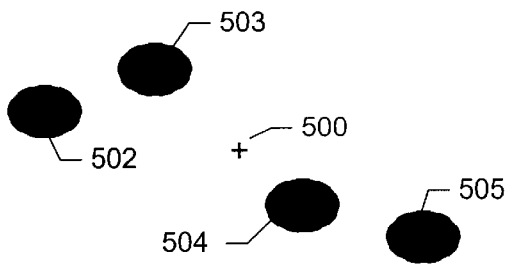
Figure 16F:
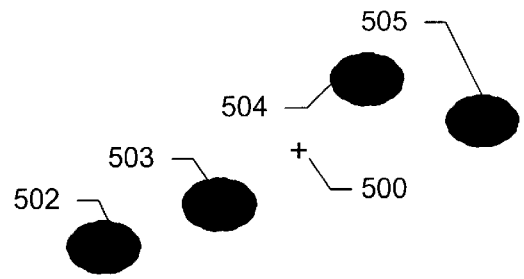

While modifier zones beneficially allow simultaneous selection of any combination of up to four different modifier types by a single hand, the typist must be careful of hand alignment with respect to the zones to operate them accurately. On surfaces without a home row of keys to encourage hand alignment, or when the user is primarily pointing rather than typing, an alternative, hand-position-independent method to select different types of modifiers is desirable. FIG. 16 shows six sets of chord touches that are distinguishable not by their finger combination or alignment with respect to the key layout, but by the relative arrangement of the four fingertips index 502 through pinky 505 within the chord. The arrangements shown would most likely arise from right hand chord performances; left hand chord performances would produce the mirror image of these arrangements. Each arrangement can be assigned a different modifier type to allow a wide range of modifier selections anywhere on the touch surface. The arrangement of FIG. 16A is most relaxed and is thus preferred for the Shift modifier. The arrangement of FIG. 16B is preferably mapped to Ctrl, FIG. 16E to Alt, FIG. 16C to Ctrl Shift, and the remaining arrangements to any other modifiers useful on a particular host computer. The crosshairs 500 indicate the centroid of each fingertip arrangement and will be used as the coordinate origin when storing the arrangements as templates.

Figure 17:
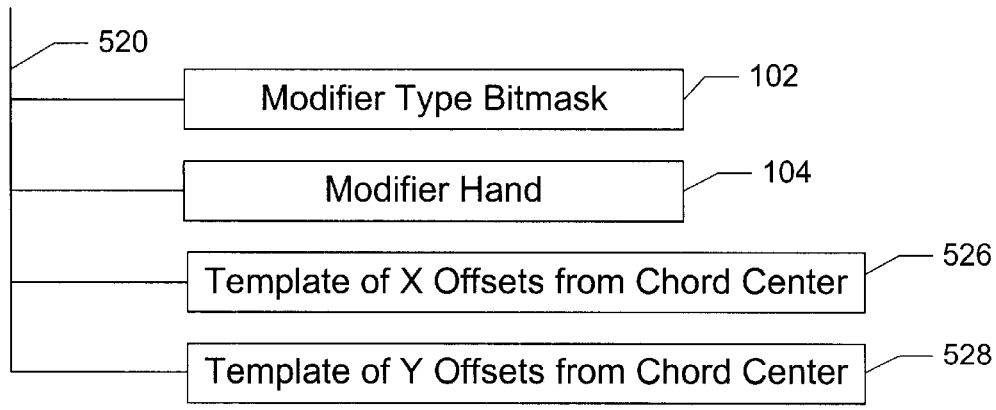
FIG. 17 illustrates alternative configuration parameters that can encode a template for a recognizable arrangement of fingers within a modifier chord.

FIG. 17 shows a configuration data structure 520 suitable for storing fingertip arrangement templates and associating them with particular modifier types. Thus configuration data structure 520 is an alternative to the modifier zone embodiment 100 of configuration data 54. It has a modifier type bitmask 102 and modifier hand source 104 equivalent to the modifier zone data structure 100. Each data structure 520 encodes one of the fingertip arrangements from FIG. 16 or the like as a template of four x offsets 526 and four y offsets 528 from the chord center 500. Encoding them as offsets from the centroid 500 of the 4 fingertip locations will help template matching in FIG. 18 be neutral to absolute hand position on the surface.

Figure 18:
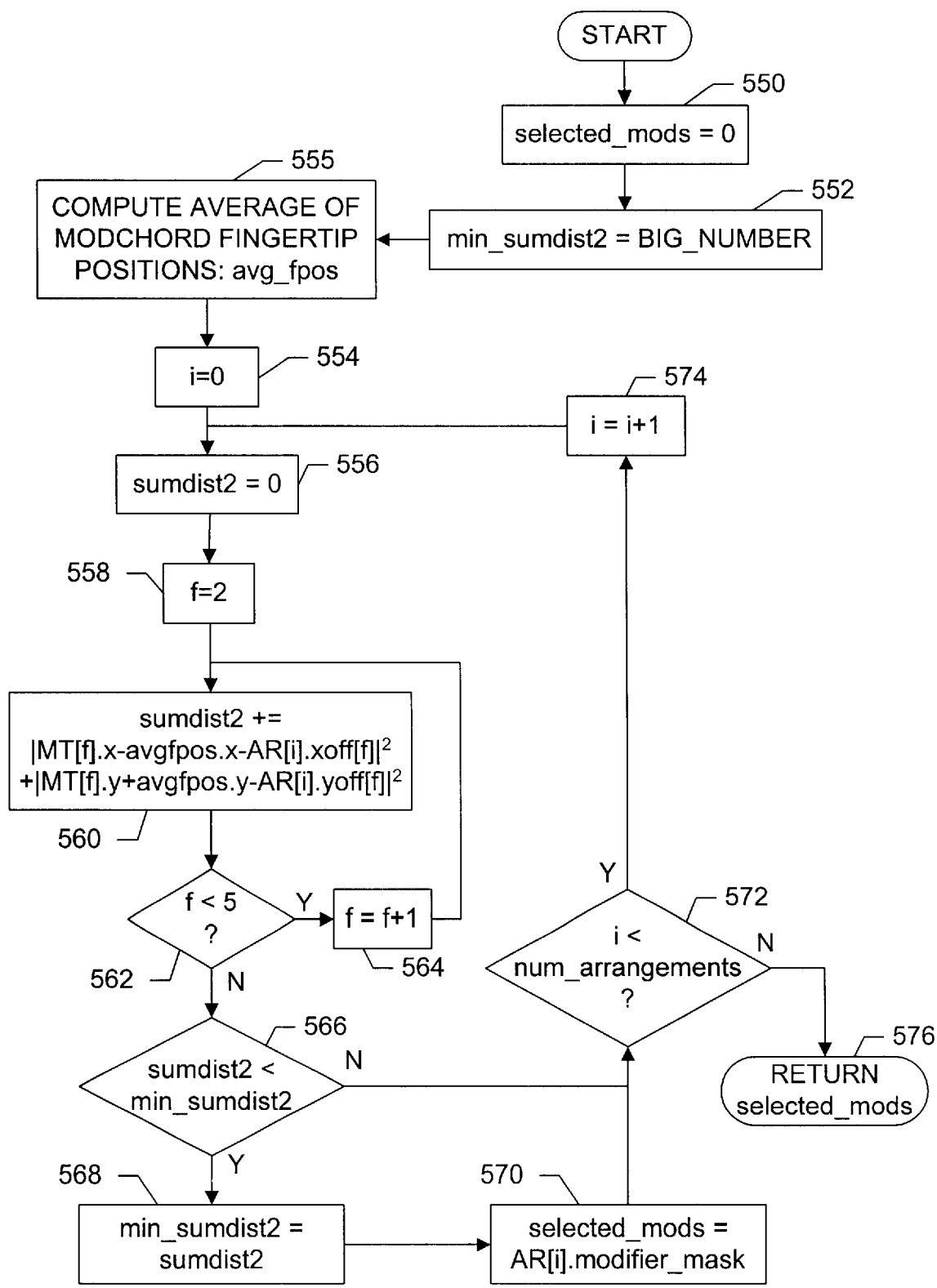
FIG. 18 is a flowchart of the alternative modifier selection process that finds the fingertip arrangement template that most closely matches the fingertip arrangement within a performed chord irrespective of absolute hand position on the surface.

The pattern matching process of FIG. 18 selects the template arrangement that best matches the measured arrangement of fingertips performing a modifier chord. This arrangement matching process is thus an alternative to FIG. 10's modifier zone selection embodiment of block 164. An array AR[ ] of the template data structures 520 constitutes the data 54. Step 550 clears selected_mods, the variable whose bits will hold the selected modifier types. Step 552 initializes min_sumdist2, the variable that will hold the lowest match error of evaluated templates, to a very large number. Step 555 computes the average or centroid, avg_fpos, of the four fingertip locations from the MT[ ] modifier touch array. Step 554 clears the arrangement template index i. Step 556 clears the squared error sum_dist2 for the current template AR[i]. Step 558 initializes the finger identity index to 2 indicating the index finger. Steps 560–564 then loop through to the pinky accumulating the squared error between each fingertip's offset from chord center and the corresponding template point's offset from chord center. Decision diamond 566 checks whether the squared error for template AR[i] make it the best match so far, and if so step 568 updates min_sumdist2 and step 570 stores template AR[i]'s modifier type 522 as the modifier selected so far. Decision diamond 572 determines whether all template arrangements have been tested, and if not step 574 advances the index i to the next template. Once all arrangements have been tested, step 576 will return the modifier type 522 of the template 520 which most closely matches the measured arrangement of modifier touches MT[ ].

Those with ordinary skill in the art will be able to adapt the present invention to use different finger combinations such as three fingertips or a thumb and three fingertips for modifier chords. However, the four fingertip combination is both easiest to perform and by far most compatible with the typing, hand resting, and pointing activities that can also take place on a multi-touch surface. Using the thumb and three fingertips is a bit more awkward and would necessitate cancellation when the pinky, or in general, a fifth digit touched the surface before commit by other modifiable input activity. Using three fingertips for modifier chords would necessitate cancellation when either the thumb or a fourth fingertip from the modifier chord hand touched the surface before commit by modifiable activity on the opposite hand. Three fingertips modifier chords would also be incompatible with drag operations that are preferably assigned to three-fingertips on a multi-touch surface.

Though embodiments and applications of this invention have been shown and described, it will be apparent to those skilled in the art that numerous further embodiments and modifications than mentioned above are possible without departing from the inventive concepts disclosed herein. The invention, therefore, is not to be restricted except in the true spirit and scope of the appended claims.

What is claimed is:

1. A multi-touch surface apparatus that interprets 4-finger chords performed concurrently with other input activity as modifiers of that input activity, thereby avoiding awkward thumb or pinky reaches for conventional modifier keys, reducing hand strain and reducing the tendency of hands to drift off of home row, the apparatus comprising:

multiple-touch sensing means that reports the locations and times of finger contacts with a surface;

modifier configuration means that establishes modifier zones as horizontal bands across the surface and associates each modifier zone with one or more modifier types;

synchronization detection means that scans for modifier chord touchdowns consisting of substantially simultaneous touches by four and no more than four digits of a hand;

modifier zone selection means that selects modifier types for the chord according to which modifier zones said simultaneous touches fall within;

chord cancellation means that cancels a modifier chord if the remaining unsynchronized digit from its hand touches before other modifiable input activity commits the chord;

modifier applicability search means that commits the modifier chord and sends modifier press signals corresponding to the chord's selected modifier types to a host computer upon detection of modifiable input activity that occurs substantially between touchdown and liftoff of the modifier chord; and, chord liftoff detection means that reports when none of the digits originally constituting the modifier chord are touching the surface and sends modifier release signals to the host computer accordingly.

2. The apparatus of claim 1 wherein the apparatus additionally comprises a typing recognition means and surface key layout with a home row of keys upon which the hands normally rest, wherein the four digits that can constitute a modifier chord do not include the thumb, and wherein Shift modifier zones are configured along the home row of keys and other modifier types are configured for zones substantially above and below the home row of keys.

3. The apparatus of claim 2 wherein any Shift signals arising from a committed modifier chord are temporarily released during transmission to the host of keypress signals from a thumb key touch and then re-pressed if the modifier chord has not yet lifted.

4. The apparatus of claim 1 wherein the modifier zone selection means compensates for the natural arch in a row of relaxed fingers by computing for each touch of the modifier chord a vertical offset from a default location of the finger whose identity a contact identification means has assigned to the touch.

5. The apparatus of claim 4 wherein the modifier zone selection means simultaneously selects the modifier types from each zone within which any of the simultaneous touches fall except if some of the simultaneous touches are bunched straddling the border between two zones, in which case the modifier type associated with the single zone that the average of the vertical offsets lies within is selected.

6. The apparatus of claim 1 wherein the locations of the modifier zones on the surface are indicated to the user via printing on the surface background colors or textures unique to each zone.

7. The apparatus of claim 1 wherein the locations of the modifier zones on the surface are indicated to the user via active surface display of background colors or textures unique to each zone.

8. A multi-touch surface apparatus that interprets certain finger chords performed concurrently with other input activity as modifiers of that input activity, thereby avoiding awkward thumb or pinky reaches for conventional modifier keys, reducing hand strain and reducing the need to reposition the hands, the apparatus comprising:

multiple-touch sensing means that reports the locations and times of finger contacts with a surface;

modifier configuration means that establishes finger arrangement templates and associates each template with one or more modifier types;

synchronization detection means that scans for modifier chord touchdowns consisting of substantially simultaneous touches by a predetermined combination of digits of a hand;

finger arrangement matching means that selects for the chord the modifier types associated with the template that most closely matches the arrangement of the modifier chord touches;

chord cancellation means that cancels a modifier chord if the remaining digits from its hand not included in the predetermined combination touch before other modifiable input activity commits the chord;

modifier applicability search means that commits the modifier chord and sends modifier press signals corresponding to the chord's selected modifier types to a host computer upon detection of modifiable input activity that occurs substantially between touchdown and liftoff of the modifier chord; and, modifier chord liftoff detection means that reports when none of the digits originally constituting the modifier chord are touching the surface and sends modifier release signals to the host computer accordingly.

9. The apparatus of claim 8 wherein any Shift signals arising from a committed modifier chord are temporarily released during transmission to the host of keypress signals from thumb key touches and then re-pressed if the modifier chord has not yet lifted.

10. The apparatus of claim 8 wherein four fingertips excluding the thumb is used as the predetermined combination of digits, the neutral four fingertip arrangement of FIG. 16A is associated with the shift modifier type, and the horizontally spread arrangement template of FIG. 16B is associated with the Ctrl modifier type.

11. The apparatus of claim 8 wherein the template matching means computes the matching error as the sum of squared distances between each template point's offset from template center and the offset of the corresponding modifier chord touch from chord center, thus making the matching process independent of where the chord is performed on the surface.

* * * * *